US011682192B2

(12) United States Patent
Chukka et al.

(10) Patent No.: US 11,682,192 B2
(45) Date of Patent: Jun. 20, 2023

(54) DEEP-LEARNING SYSTEMS AND METHODS FOR JOINT CELL AND REGION CLASSIFICATION IN BIOLOGICAL IMAGES

(71) Applicant: VENTANA MEDICAL SYSTEMS, INC., Tucson, AZ (US)

(72) Inventors: Srinivas Chukka, San Jose, CA (US); Anindya Sarkar, Milpitas, CA (US); Mohamed Amgad Tageldin, Atlanta, GA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 17 days.

(21) Appl. No.: 16/891,809

(22) Filed: Jun. 3, 2020

(65) Prior Publication Data
US 2020/0342597 A1 Oct. 29, 2020

Related U.S. Application Data

(63) Continuation of application No. PCT/EP2018/083473, filed on Dec. 4, 2018.

(60) Provisional application No. 62/596,036, filed on Dec. 7, 2017.

(51) Int. Cl.
| | | |
|---|---|---|
| G06T 7/194 | (2017.01) | |
| G06V 10/82 | (2022.01) | |
| G06V 20/69 | (2022.01) | |
| G06V 10/774 | (2022.01) | |

(Continued)

(52) U.S. Cl.
CPC ........ *G06V 10/774* (2022.01); *G06F 18/2431* (2023.01); *G06T 7/0012* (2013.01); *G06T 7/194* (2017.01); *G06V 10/82* (2022.01); *G06V 20/698* (2022.01); *G06T 2207/20081* (2013.01);

(Continued)

(58) Field of Classification Search
CPC combination set(s) only.
See application file for complete search history.

(56) References Cited

U.S. PATENT DOCUMENTS

| | | |
|---|---|---|
| 5,650,327 A | 7/1997 | Copeland et al. |
| 5,654,200 A | 8/1997 | Copeland et al. |
| 6,296,809 B1 | 10/2001 | Richards et al. |

(Continued)

FOREIGN PATENT DOCUMENTS

| | | |
|---|---|---|
| JP | 2005-293264 | 10/2005 |
| JP | 2016-518813 | 6/2016 |

(Continued)

OTHER PUBLICATIONS

Haridas et al., "Interactive Segmentation Relabeling for Classification of Whole-Slide Histopathology Imagery", IEEE 28th International Symposium on Computer-Based Medical Systems, Jun. 22, 2015, pp. 84-87.

(Continued)

*Primary Examiner* — Tsung Yin Tsai
(74) *Attorney, Agent, or Firm* — Kilpatrick Townsend & Stockton LLP

(57) ABSTRACT

Automated systems and methods for training a multilayer neural network to classify cells and regions from a set of training images are presented. Automated systems and methods for using a trained multilayer neural network to classify cells within an unlabeled image are also presented.

12 Claims, 11 Drawing Sheets
(7 of 11 Drawing Sheet(s) Filed in Color)

(51) Int. Cl.
  *G06T 7/00* (2017.01)
  *G06F 18/2431* (2023.01)
(52) U.S. Cl.
  CPC .......... *G06T 2207/20084* (2013.01); *G06T 2207/30024* (2013.01); *G06T 2207/30096* (2013.01)

(56) References Cited

U.S. PATENT DOCUMENTS

| | | | |
|---|---|---|---|
| 6,352,861 | B1 | 3/2002 | Copeland et al. |
| 6,827,901 | B2 | 12/2004 | Copeland et al. |
| 6,943,029 | B2 | 9/2005 | Copeland et al. |
| 9,922,433 | B2* | 3/2018 | Schieke ............... G06T 7/0012 |
| 10,304,188 | B1* | 5/2019 | Kumar ................ G06V 20/695 |
| 10,475,190 | B2* | 11/2019 | Sarkar ................. G06V 20/695 |
| 10,706,535 | B2* | 7/2020 | Arar ..................... G06F 18/214 |
| 2002/0186874 | A1* | 12/2002 | Price .................... G01N 15/147 382/173 |
| 2003/0211630 | A1 | 11/2003 | Richards et al. |
| 2004/0052685 | A1 | 3/2004 | Richards et al. |
| 2006/0280348 | A1* | 12/2006 | Smith ................... G06T 7/0012 382/128 |
| 2010/0111396 | A1* | 5/2010 | Boucheron .......... G06T 7/0012 382/133 |
| 2011/0182490 | A1 | 7/2011 | Hoyt et al. |
| 2016/0350946 | A1* | 12/2016 | Schieke ............... G06T 11/008 |
| 2017/0091937 | A1 | 3/2017 | Barnes et al. |
| 2017/0098310 | A1 | 4/2017 | Chefd'hotel et al. |
| 2017/0103521 | A1 | 4/2017 | Chukka et al. |
| 2017/0140246 | A1 | 5/2017 | Barnes et al. |
| 2017/0154420 | A1 | 6/2017 | Barnes et al. |
| 2017/0169567 | A1 | 6/2017 | Chefd'hotel et al. |
| 2017/0337596 | A1 | 11/2017 | Larkin |
| 2017/0337695 | A1* | 11/2017 | Sarkar ..................... G06T 7/136 |
| 2018/0129911 | A1* | 5/2018 | Madabhushi ........ G06V 10/764 |
| 2018/0211380 | A1* | 7/2018 | Tandon ................. G06V 20/69 |
| 2019/0065867 | A1* | 2/2019 | Huang ................... G08G 1/167 |
| 2019/0080450 | A1* | 3/2019 | Arar ........................ G06T 7/194 |
| 2019/0272638 | A1* | 9/2019 | Mouton ............... G06V 20/698 |
| 2020/0342597 | A1* | 10/2020 | Chukka ................. G06V 10/82 |

FOREIGN PATENT DOCUMENTS

| | | |
|---|---|---|
| JP | 2017-516992 | 6/2017 |
| WO | 2011049608 | 4/2011 |
| WO | 2014102130 | 7/2014 |
| WO | 2014140085 | 9/2014 |
| WO | 2014195193 | 12/2014 |
| WO | 2015113895 | 8/2015 |
| WO | 2015124772 | 8/2015 |
| WO | 2015181371 | 12/2015 |
| WO | 2016075095 | 5/2016 |
| WO | 2016075096 | 5/2016 |
| WO | 2016120442 | 8/2016 |
| WO | 2016133900 | 8/2016 |
| WO | 2019020556 | 1/2019 |

OTHER PUBLICATIONS

PCT/EP2018/083473, "International Search Report and Written Opinion", dated Mar. 13, 2019, 13 pages.
Application JP2020-531491, Notice of Reasons for Rejection dated Oct. 18, 2022, 9 pages (pp. 1-5 English translation, pp. 6-9 original document).
Ausubel et al., Current Protocols in Molecular Biology, Greene Publishing Associates and Wiley-Intersciences, Dec. 4, 2003, 388 pages.
Balmer et al., Effects of Ursodeoxycholic Acid in Combination with Vitamin E on Adipokines and Apoptosis in Patients with Nonalcoholic Steatohepatitis, Liver International, vol. 29, No. 8, Sep. 1, 2009, pp. 1184-1188.
Chopra et al., Validation and Usefullness of Indian Version (CRD Pune) Health Assessment Questionnaire: Drug Trials, Community Practice and Copcord Bhigwan Population Study, Indian Journal of Rheumatology, vol. 7, No. 2, Apr. 11, 2012, pp. 74-82.
Takahashi, et al., "Pathological Diagnosis Support System Using Neural Networks", Journal of Signal Processing, Japan, Research Institute of Signal Processing, Nov. 30, 1999, vol. 3, No. 6, pp. 407-414.
Yamamoto, et al., "A Study on Image Segmentation by K-Means Algorithm", IPSJ SIG Technical Reports, Japan, Information Processing Society of Japan, Dec. 19, 2003, vol. 2003, No. 125, pp. 173-178.
Shimada, et al., "Method for Obtaining a Foot Region from Time-Sequential Images of Foot Pressure for Gait Guidance", The Transactions of the Institute of Electronics, Information and Communication Engineers, Japan, Apr. 1, 2003, vol. J86-D-II, No. 4, pp. 501-510.
Haridas, et al., "Interactive Segmentation Relabeling for Classification of Whole-Slide Histopathology Imagery", 2015 IEEE 28th International Symposium on Computer-Based Medical Systems, USA, IEEE, Jun. 22, 2015, pp. 84-87.
Ciompi, et al., "The Importance of Stain Normalization in Colorectal Tissue Classification with Convolutional Networks", 2017 IEEE 14th International Symposium on Biomedical Imaging (ISBI 2017), USA, IEEE, Apr. 18, 2017, pp. 160-163.
European Application No. 18814866.2, Office Action dated May 12, 2022, 5 pages.
Japan Application 2020-531491, Office Action dated Jul. 4, 2022, 11 pages (pp. 1-6 English translation, pp. 7-11 original Office Action).
European Application No. 18833184.7, Office Action dated Feb. 18, 2022, 10 pages.
Gonzalez et al., Digital Image Processing, Third Edition, Chapter 10, 2008, p. 689.
Huang et al., Densely Connected Convolutional Networks, In Computer Vision and Pattern Recognition, 2017, pp. 4700-4708.
Kong et al., A Comprehensive Framework for Classification of Nuclei in Digital Microscopy Imaging: An Application to Diffuse Gliomas, Proceedings in Institute of Electrical and Electronics Engineers International Symposium Biomedical Imaging, Mar. 30, 2011, pp. 2128-2131.
Lawson et al., Solving least squares Problems, Prentice Hall, Chapter 23, 1974, 6 pages.
Long et al., Fully Convolutional Networks for Semantic Segmentation, IEEE Conference on Computer Vision and Pattern Recognition (CVPR), Jun. 7-12, 2015, pp. 1-10.
Pan et al., A Survey on Transfer Learning, IEEE Transactions of Knowledge and Data Engineering, vol. 22, No. 10, Oct. 2010, pp. 1-15.
Parvin et al., Iterative Voting for Inference of Structural Saliency and Characterization of Subcellular Events, Institute of Electrical and Electronics Engineers Transactions on Image Processing, vol. 16, No. 3, Mar. 2007, pp. 615-623.
International Application No. PCT/EP2018/083473, International Preliminary Report on Patentability dated Jun. 18, 2020, 10 pages.
International Application No. PCT/EP2018/085308, Invitation to Pay Additional Fees and, Where Applicable, Protest Fee dated Jun. 6, 2019, 10 pages.
Russakovsky et al., ImageNet Large Scale Visual Recognition Challenge, International Journal of Computer Vision, vol. 115, No. 3, Jan. 30, 2015, pp. 1-43.
Sambrook et al., Molecular Cloning: A Laboratory Manual, Second Edition, Cold Spring Harbor Laboratory Press, 1989, 30 pages.
Veta et al., Automatic Nuclei Segmentation in H&E Stained Breast Cancer Histopathology Images, Public Library of Science, vol. 8, No. 7, e70221, Jul. 2013, 12 pages.
Xing et al., Robust Nucleus/Cell Detection and Segmentation in Digital Pathology and Microscopy Images: A Comprehensive Review, Institute of Electrical and Electronics Engineers Reviews in Biomedical Engineering, vol. 9, Jan. 2016, pp. 234-263.
Zimmermann, Spectral Imaging and Linear Unmixing in Light Microscopy, Advances in Biochemical Engineering/Biotechnology, vol. 95, 2005, pp. 245-265.

* cited by examiner

DEEP-LEARNING SYSTEMS AND METHODS FOR JOINT CELL AND REGION CLASSIFICATION IN BIOLOGICAL IMAGES

CROSS-REFERENCES TO RELATED APPLICATIONS

The present application is a continuation of International Application PCT/EP2018/083473, entitled "Deep-Learning Systems And Methods For Joint Cell And Region Classification In Biological Images" and filed Dec. 4, 2018, which claims priority to U.S. Provisional Application No. 62/596,036, filed Dec. 7, 2017. Each of these applications is hereby incorporated by reference in its entirety for all purposes.

BACKGROUND

Digital pathology involves scanning of whole histopathology or cytopathology glass slides into digital images interpretable on a computer screen. These images are to be processed subsequently by an imaging algorithm or interpreted by a pathologist. In order to examine tissue sections (which are virtually transparent), tissue sections are prepared using colored histochemical stains that bind selectively to cellular components. Color-enhanced, or stained, cellular structures are used by clinicians or a computer-aided diagnosis (CAD) algorithm to identify morphological markers of a disease, and to proceed with therapy accordingly. Observing the assay enables a variety of processes, including diagnosis of disease, assessment of response to treatment, and development of new drugs to fight disease.

Immunohistochemical (IHC) slide staining can be utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In-situ hybridization (ISH) can be used to look for the presence of a genetic abnormality or condition such as amplification of cancer causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample.

SUMMARY

The traditional approach for the problem of image scoring and automated image analysis of digitized tissue slides of biological specimens generally involves cell detection, cell segmentation, and feature extraction for each cell within an image (or region thereof), followed by cell classification, as well as region segmentation and classification. The present disclosure provides an alternative approach whereby cells and regions are jointly and simultaneously classified from the acquired images directly using a trained multilayer neural network. As such, the present disclosure utilizes a deep learning approach where cells are automatically detected, segmented, and classified following the training of a multilayer neural network. Both cell level data and region level data which are, in some embodiments, generated using semi-automated image analysis methods, are utilized as ground truth to train the multilayer neural network.

In some embodiments, existing feature based segmentation techniques may be used to generate reliable estimates of cell contours and used as ground truth to train the multilayer neural network. It is believed that performing this task manually would make the ground truthing process for all cells in the sample image (or region thereof) infeasible, since the sample images are typically quite large, having thousands of cells. In some embodiments, a priori knowledge of feature vectors which are useful in cell based classification are used as additional input channels to further aid the multilayer neural network in improving the classification accuracy. In some embodiments, instead of using a user to ground truth each and every cell, an existing feature-based solution to derive initial cell labels is first utilized, and a pathologist or other medical professional browses through the initial result set, and corrects cells which have been misclassified. Such a semi-automated solution helps to generate a large amount of cellular and regional ground truth data that is otherwise not easily possible.

In view of the foregoing, in one aspect of the present disclosure is a method of training a multilayer neural network to detect and classify different cell types (e.g. tumor cells, stromal cells, lymphocytes, etc.) and tissue regions (e.g. tumor regions, lymphocyte-rich regions, stromal regions, necrotic regions, etc.) within a sample image (e.g. a sample image of a biological sample tissue having one or more stains), the method comprising: receiving sample image data; generating both tissue region and cell classification ground truth data using a semi-automated process; and training a multilayer neural network using the generated ground truth data; wherein the ground truth data generation takes into consideration a priori knowledge regarding whether certain types of cells may be present in certain types of tissues or regions.

In some embodiments, the generated tissue region ground truth data is manually identified by a pathologist. In some embodiments, cell classification is performed using an automated image analysis algorithm to provide prospective cell classifications (e.g. detecting seed centers, then classifying the detected cells by analyzing features within the input image). In some embodiments, the prospective cell classifications determined by the image algorithm are reviewed by a pathologist and any false classifications are corrected using input from the pathologist (e.g. by using an image and annotation reviewing and editing platform) such that final cell classification data is supplied as ground truth data to the multilayer neural network. In some embodiments, the tissue region classification data and the final cell classification data is combined such that each pixel within the sample image is labeled with a single label denoting tissue type and or cell type (i.e. the label is vector). In some embodiments, the combining of a tissue label and cell label excludes those tissue and cell combinations that are biologically infeasible, i.e. combinations of cells in particular regions that would not occur in nature or have a very low probability of occurring.

In some embodiments, the sample image is a simplex image (i.e. one stained with a primary stain or stained for the presence of a single biomarker as noted herein). In some embodiments, the sample image is stained with hematoxylin and eosin (an H&E image). In some embodiments, the sample image is a simplex immunohistochemistry stained image or a multiplex image, whereby the multiplex image is first unmixed prior to generating ground truth data (such as with an unmixing modules, as noted herein). In some embodiments, the sample image is derived from a breast tissue sample.

In another aspect of the present disclosure is a method of training a multilayer neural network to detect and classify different cell types and regions within a sample image, the method comprising: in order to generate the ground truth to train the classifier identifying different tissue regions within a sample image of a biological specimen; detecting and classifying cells based on image features within the sample image to provide prospective cell classifications; correcting incorrectly classified prospective cell classifications using input from a pathologist to provide final cell classifications; assigning a label for each pixel within the sample image based on a combination of the identified tissue regions and final cell classifications, wherein the label is assigned only for those cell and region combinations which are biologically feasible; and training the multilayer neural network using the sample image and the labels assigned to each pixel within the sample image (i.e. training the multilayer neural network with the established ground truth data at the pixel level).

In some embodiments, the identifying of the different regions within the sample image is manually performed by a pathologist (e.g. the pathologist may annotate portions of an image corresponding to different tissue types). In some embodiments, the identifying of the different tissue regions within the sample image is automated or semi-automated.

In some embodiments, the detecting and classifying of cells based on features within the sample image comprises: (i) detecting cell nuclei; (ii) computing a foreground segmentation mask, (iii) deriving features from the detected cell nuclei; and (iv) classifying the nuclei based on the derived features using a classifier (e.g. a support vector machine, etc.). In some embodiments, a segmentation mask is not generated, but rather DetectNET, which assigns a label to the whole image patch rather than a label for each pixel, is utilized. In such a case, the image patch corresponds to a patch centered around each cell (see DetectNet: Deep Neural Network for Object Detection in DIGITS, from https://devblogs.nvidia.com/parallelforall/detectnet-deep-neural-network-object-detection-dig its/).

In some embodiments, the detecting and classifying of cells is automated, utilizing an image analysis algorithm. The automated cell detection and cell classification, in some embodiments, provides for prospective cell classifications which may be reviewed by a pathologist. In some embodiments, a pathologist reviews the prospective cell classifications and makes a determination of whether the prospective classifications are accurate. In some embodiments, the pathologist corrects any inaccuracies thereby providing revised cell classifications, which are provided along with the correctly identified prospective cell classifications to provide a final cell classification set to the multilayer neural network for training.

In some embodiments, the assigned label for each pixel is a vector comprising an identification of the classified cell type and tissue region or tissue type in which the pixel is located in the sample image. In some embodiments, the tissue regions include tumor regions, stromal regions, lymphocyte-rich regions, and necrotic regions. In some embodiments, the cell types include tumor cells, stromal cells, and lymphocytes. In some embodiments, biologically feasible combinations are those in which a cell is normally found in a particular type of tissue. By way of example only, the biologically feasible combinations include (i) tumor cells in tumor regions; (ii) stromal cells in tumor regions; (iii) lymphocytes in tumor regions; (iv) tumor cells in stromal regions; (v) stromal cells in stromal regions; (vi) lymphocytes in stromal regions; (vii) tumor cells in lymphocyte-rich regions; and (viii) lymphocytes in lymphocyte-rich tissue. In some embodiments, the method further comprises providing the unlabeled image to the trained multilayer neural network and receiving predictive labels for each pixel within the unlabeled image.

In some embodiments, the assigned labels and sample image are provided to a multilayer neural network, such as LeNet, AlexNet, ZF Net, GoogLeNet, VGGNet ResNet, VGGNetVGG16, VGG19, and DenseNet, as described herein. These neural networks are typically trained on a large and publicly available image data archives (ImageNet for example) of natural images. Given that typically the training images for biological specimens such as tumor samples are fewer, transfer learning methods are adopted. In some embodiments, "transfer learning" methods may be used, where pre-trained networks, such as those mentioned above, along with their learnt weights are used to initialize the training process on the new set of training images, and trained to adapt the weights to the specific application at hand. In some embodiments, the pre-trained networks are trained on existing public or private datasets that may or may not be directly related to the application of interest, and may or may not be biological in nature. In some embodiments, the final layers' weights are initialized at random to avoid falling into suboptimal local minima, while in other embodiments, the final layers' weights are imported unchanged.

In another aspect of the present disclosure is a system comprising: a multilayer neural network, and a ground truth training module configured to (i) identify different regions (e.g. tissue regions) within a sample image of a biological specimen; (ii) detect and classify cells based on image features within the sample image to provide proposed cell classifications; (iii) correct misclassified proposed cell classifications using input from a pathologist to provide final cell classifications; (iv) assign a label for each pixel within the sample image based on a combination of the identified regions and final cell classifications, wherein the label is assigned only for those cell and region combinations which are biologically feasible; and (v) train the multilayer neural network using the sample image and the labels assigned to each pixel within the sample image. In some embodiments, the sample image is a simplex image (e.g. one stained with a primary stain or a single biomarker). In other embodiments, the sample image is a multiplex image.

In some embodiments, the ground truth training module is semi-supervised. In some embodiments, identification of different tissue regions comprises annotating the sample image with the different regions. In some embodiments, the annotation is performed by the pathologist. In some embodiments, the detection and classification of cells utilizes image analysis algorithms which identify features of cells (e.g. morphological features, nuclear features, etc.). In some embodiments, the detection and classification of cells based on features within the sample image comprises (i) detecting cell nuclei; (ii) computing a foreground segmentation mask, (iii) deriving features from the detected cell nuclei; and (iv)

classifying the nuclei based on the derived features using a classifier (e.g. a support vector machine, etc.). In some embodiments, the ground truth training module is adapted to recognize biologically feasible cell classifications and tissue region identification combinations including (i) tumor cells in tumor regions; (ii) stromal cells in tumor regions; (iii) lymphocytes in tumor regions; (iv) tumor cells in stromal regions; (v) stromal cells in stromal regions; (vi) lymphocytes in stromal regions; (vii) tumor cells in lymphocyte-rich regions; and (viii) lymphocytes in lymphocyte-rich regions. In some embodiments, the multilayer neural network is selected adapted from the group consisting of existing convolutional (or fully-convolutional) neural network architectures, such as LeNet, AlexNet, ZF Net, GoogLeNet, VGGNet, ResNet, VGG16, and DenseNet.

In another aspect of the present disclosure is a non-transitory computer-readable storage medium encoded with instructions executable by a processing resource of a computing system to cause the computing system to: identify different tissue regions within a sample image of a biological specimen; detect and classify cells based on features within the sample image to provide proposed cell classifications; assign a label for each pixel within the sample image based on a combination of the identified tissue regions and final cell classifications, wherein the label is assigned only for those cell and region combinations which are biologically feasible, and wherein the final cell classifications comprise correctly classified proposed cell classifications and revised proposed cell classifications, the revised proposed cell classifications received as input from a pathologist; and train the multilayer neural network using the sample image and the labels assigned to each pixel within the sample image. In some embodiments, the identification of the different tissue regions comprises receiving tissue region annotations from a pathologist.

In another aspect of the present disclosure is a method of classifying cells within an unlabeled image of a biological sample comprising: computing a foreground segmentation mask for the unlabeled image; identifying individual cells in the unlabeled image by filtering the unlabeled image with the computed foreground segmentation mask; applying to the unlabeled image a multilayer neural network trained to jointly detect and classify different cell types and tissue regions, wherein the application of the trained multilayer neural network provides predictive labels for each pixel within the unlabeled image, the predictive labels corresponding to different cell types as identified by the multilayer neural network; and assigning a cell label to each identified individual cell. In some embodiments, the cell labels are assigned by (i) quantifying a number of pixels bearing each predictive label within the identified individual cell; and (ii) assigning as the cell label the predictive label having the greatest quantity (majority vote). The method of claim 12, further comprising generating an overlay comprising descriptive indicia for each labeled individual cell. In some embodiments, the method further comprises quantifying the differently labeled individual cells and computing an expression score. In some embodiments, the quantification is carried out in a pre-determined field-of-view. In some embodiments, the pre-determined field-of-view is identified by a pathologist based on morphology within the unlabeled image. In some embodiments, a number of lymphocytes in a tumor region or a stromal region is quantified.

In another aspect of the present disclosure is a system comprising: a cell detection module adapted to identify cells within an unlabeled image; a multilayer neural network trained to provide predictive labels for each pixel within the unlabeled image, the predictive labels corresponding to different cell types; and a cell labeling module adapted to confer a cell label to cells identified by the cell detection module. In some embodiments, the cells are labeled by (i) quantifying a number of pixels bearing each predictive label within the identified cell; and (ii) assigning as the cell label the predictive label having the greatest quantity (majority vote). In some embodiments, the cell detection module identifies seeds within the unlabeled image. In some embodiments, the system further comprises a scoring module configured to count the cell labels in the unlabeled image and output an expression score based on ratios of the various counted cell labels. In some embodiments, scoring is performed within a pre-determined field-of-view within the unlabeled image. In some embodiments, the system further comprises an overlay masking module configured to superimpose indicia representative of the different cell types on the unlabeled image.

In another aspect of the present disclosure is a non-transitory computer-readable storage medium encoded with instructions executable by a processing resource of a computing system to cause the computing system to: detect cells within an unlabeled image; apply to the unlabeled image a multilayer neural network trained to jointly detect and classify different cell types and tissue regions, wherein the application of the trained multilayer neural network provides predictive labels for each pixel within the unlabeled image, the predictive labels corresponding to different cell types as identified by the multilayer neural network; and assign a cell label to each identified individual cell. In some embodiments, the cells labels are assigned by (i) quantifying a number of pixels bearing each predictive label within the identified individual cell; and (ii) assigning as the cell label the predictive label having the greatest quantity (majority vote). In some embodiments, the detection of cells within the unlabeled image comprises (i) computing a foreground segmentation mask for the unlabeled image; and (ii) identifying individual cells in the unlabeled image by filtering the unlabeled image with the computed foreground segmentation mask. In some embodiments, the system further comprises instructions to score the unlabeled image based on the assigned cell labels. In some embodiments, the system further comprises instructions to generate an overlay comprising indicia representative of the different cell layers, and applying the overlay to the unlabeled image.

Given the increasing role of immunotherapy, there is an increasing need to detect and quantify tumor infiltrating lymphocytes (TiLs) in H&E images. The main problem being solved here is joint cell detection and classification along with region segmentation and classification, for H&E breast cancer images, in a unified deep learning framework. Though the solutions here have been proposed only for two specific classification problems (cell based classification and region based classification), and for a specific domain (H&E breast cancer images), the proposed solution is applicable for a wider variety of classification problems for other domains. The aim of the joint cell and region classification work is to characterize and quantify the tumor microenvironment, identify inter- and intra-tumor and cellular spatial relations, and characterize tumor-infiltrating lymphocytes, including stromal and intra-tumoral TiL's, through quantitative (e.g. percentage) and spatial metrics.

The advantage of combining different classification problems in the same deep learning framework is that the combination of the results of various classification problems can then be done automatically and reconciled by the learning framework, and would not depend on any post-processing (ensemble learning based, or parameter-tuning based methods) to combine the two sets of results (e.g. cell level and region level results). For example, when we consider an image with k1 classification categories (set A) in one domain, and then a problem with k2 classification categories (set B) for the same image but in a different domain, then we can consider the problem as a (k1×k2) multi-class problem, and if there are certain biological combinations of elements in (set A, set B) which are infeasible, then we can discard them from the admissible set of (k1×k2) classes that can be assigned by the network. Thus, a priori biological knowledge of the problem is made use of to generate consistent results. Applicants further submit that the overall accuracy of both region and cell classification can be better, as compared with independently and individually solving cell and region classification problems separately, since the iterative process of learning both simultaneously prefers mutually consistent combined classification labels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a general understanding of the features of the disclosure, reference is made to the drawings. In the drawings, like reference numerals have been used throughout to identify identical elements.

And, the region and cell labels, at pixel level, are assigned a color code to indicate the particular classification to which it belongs.

Figures 5A, 5B, 5C:
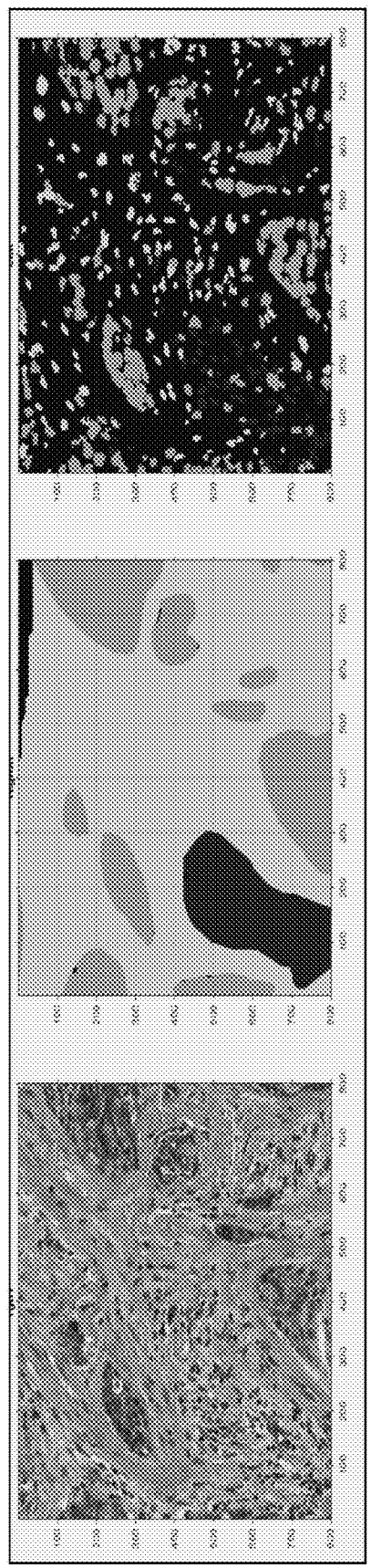

FIG. 5A illustrates a sample image, FIG. 5B illustrates a tissue region overlay, and FIG. 5C illustrates a cell classification overlay, where tumor is depicted as cyan, stroma is depicted as yellow, lymphocytes are depicted as red, and artifacts/excluded regions are depicted as dark blue.

Figure 6:
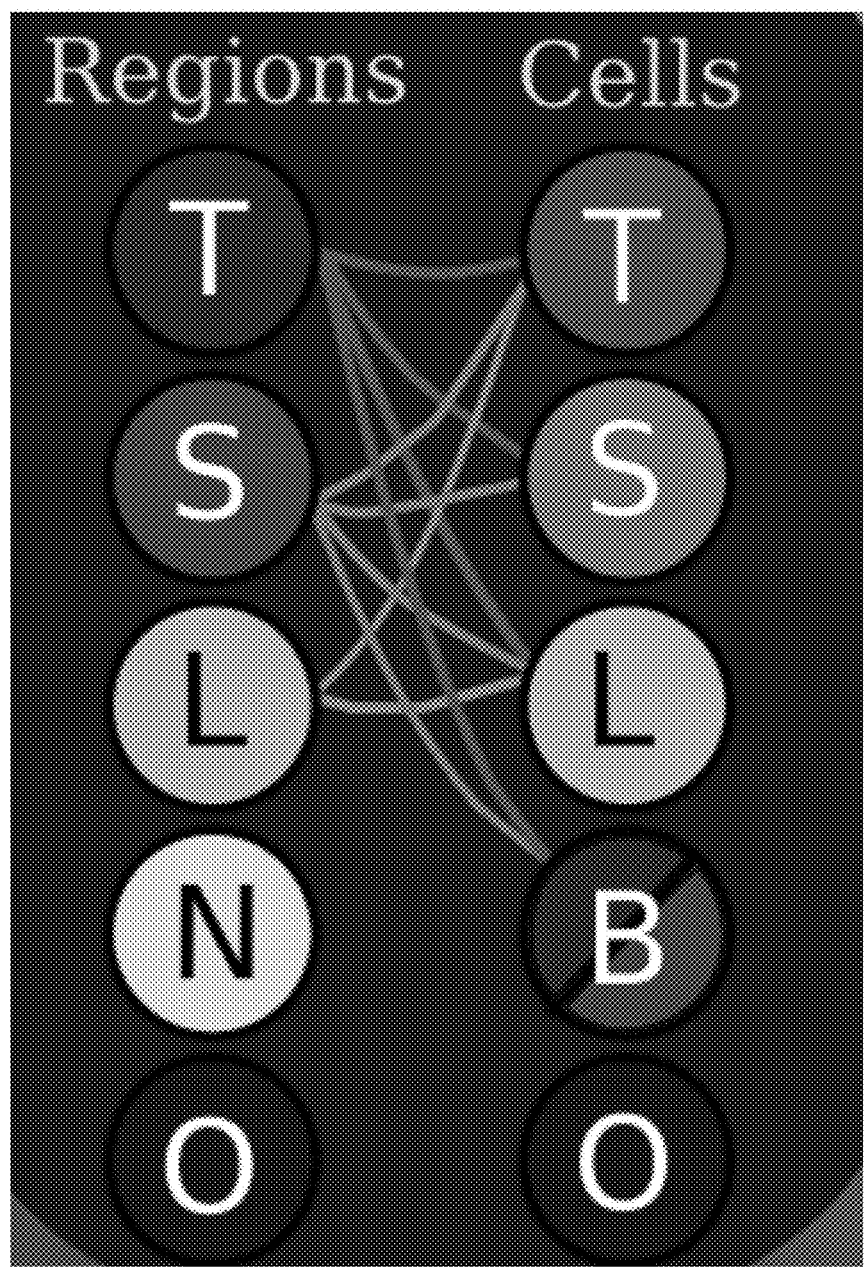

FIG. 6 illustrates the various biologically feasible combinations of cells which may be found in certain tissue types.

Figure 7:
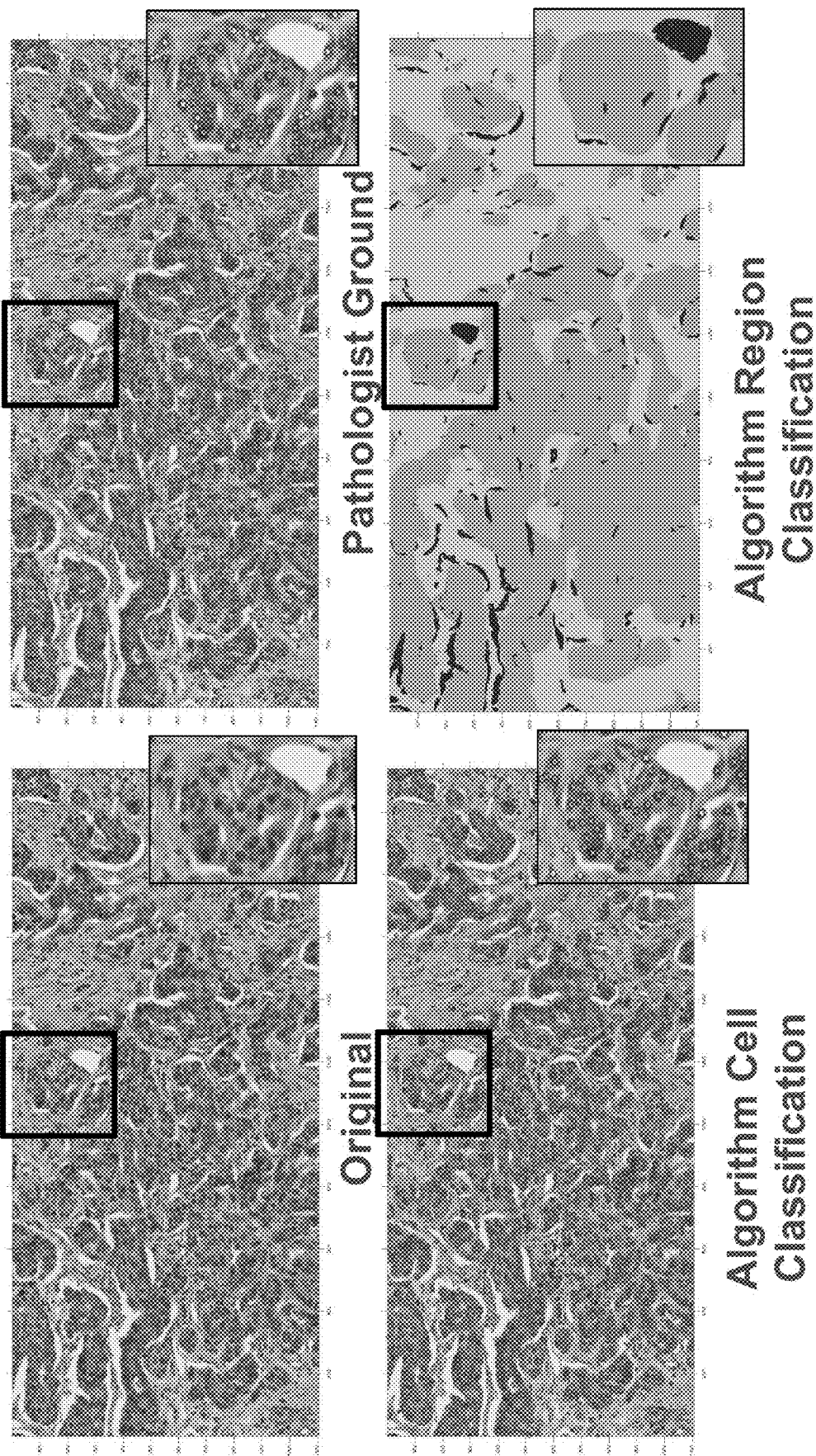

FIG. 7 illustrates a sample image ground truth and the classification results from the combined classifier, where tumor is depicted as cyan, stroma is depicted as yellow, lymphocytes are depicted as red, and artifacts/excluded regions are depicted as dark blue. The upper images are original images and the cellular ground truth overlaid on the top of the original image.

Figure 8A:
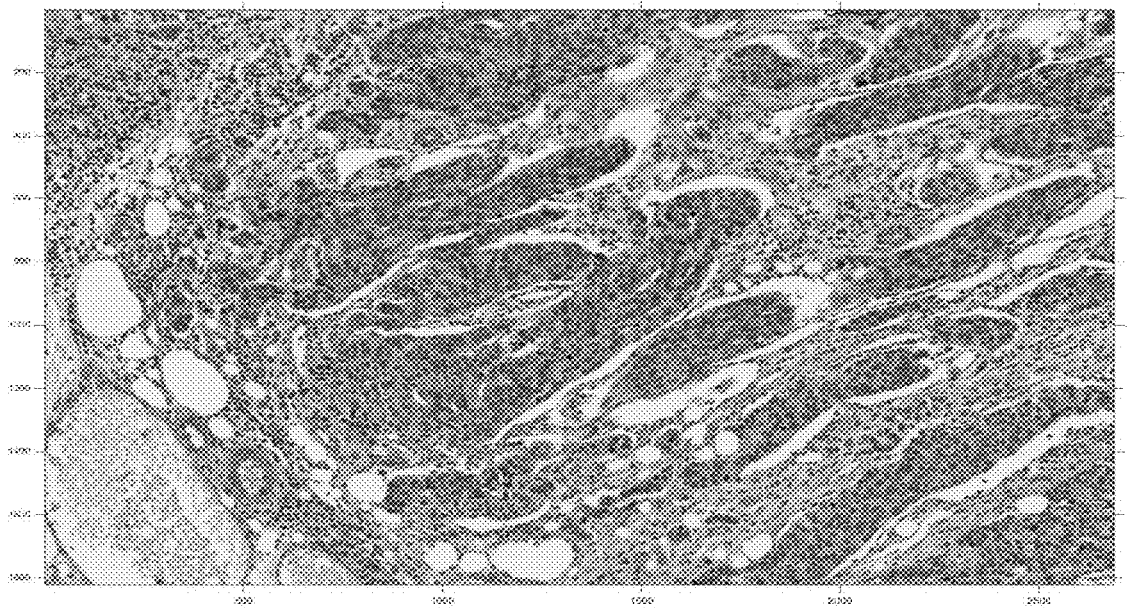
Figure 8B:
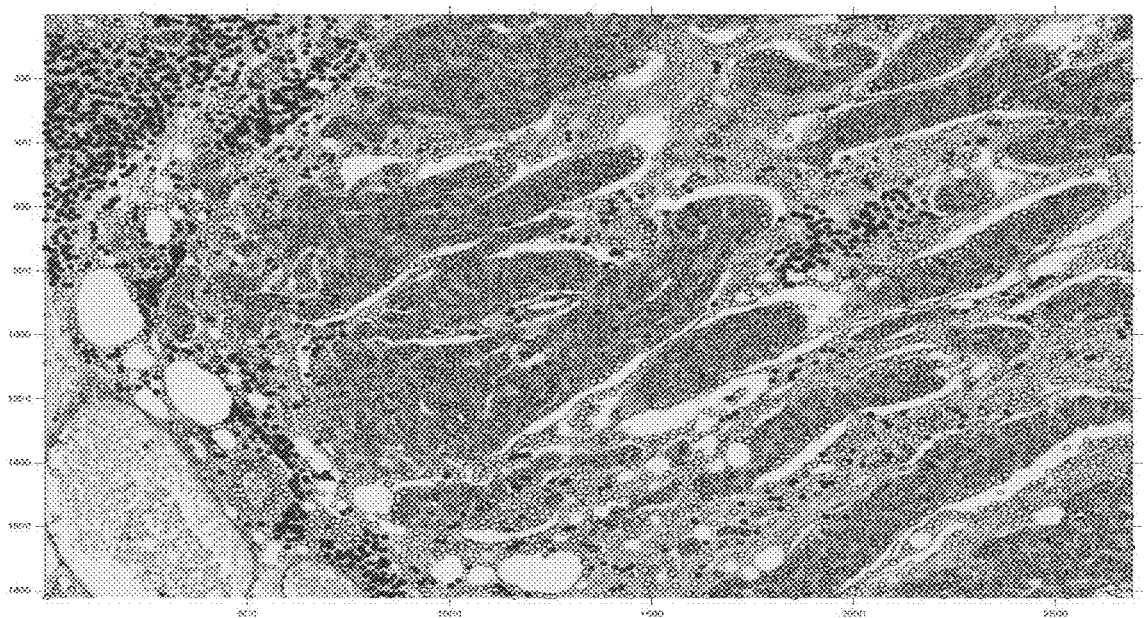
Figure 8C:
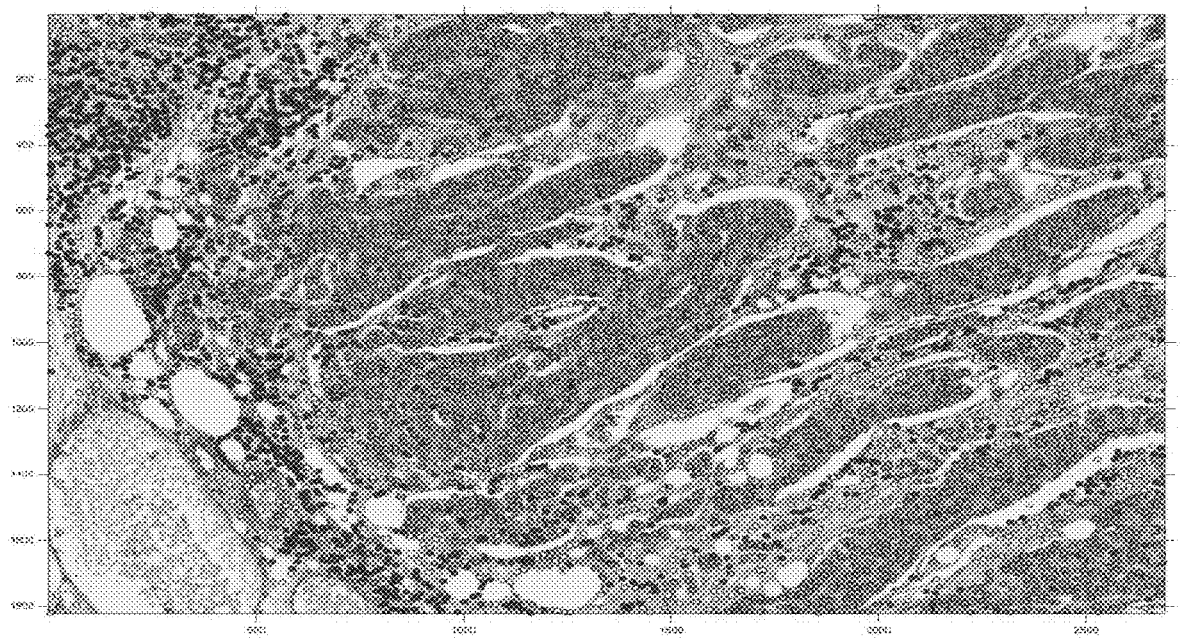
Figure 8D:
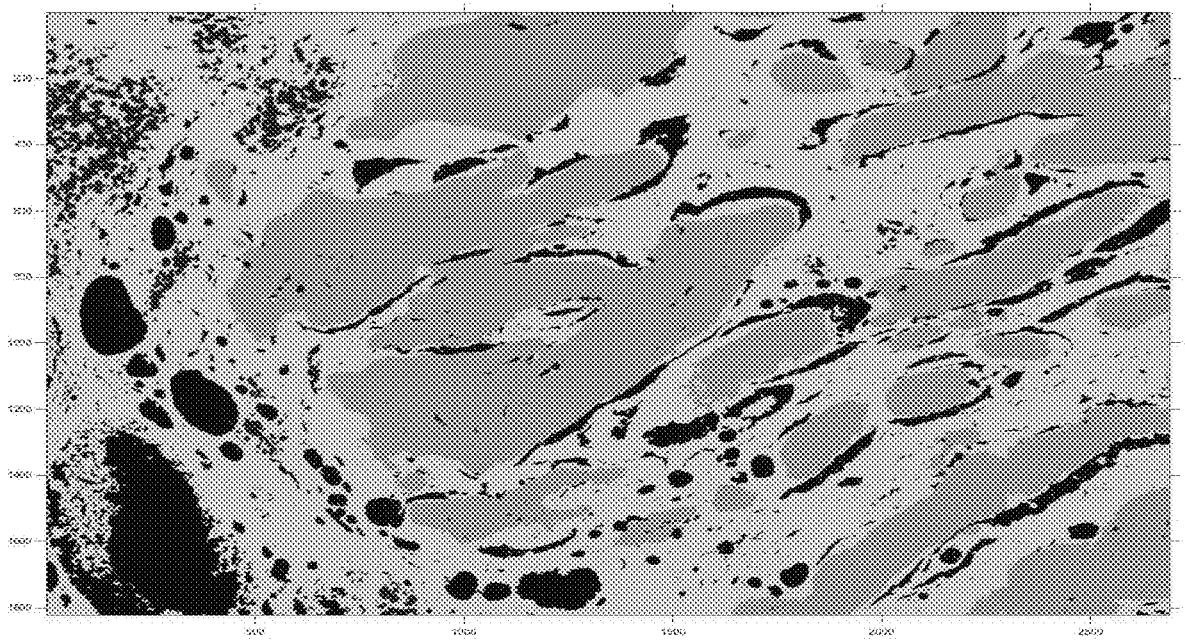

FIG. 8A illustrates an original image, FIG. 8B illustrates cell-level classification ground truth generated by the pathologist, FIG. 8C illustrates cell-level classification results by the algorithm, and FIG. 8D illustrates region-level classification results by the algorithm, where tumor is depicted as cyan, stroma is depicted as yellow, lymphocytes are depicted as red, and artifacts/excluded regions are depicted as dark blue.

DETAILED DESCRIPTION

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample", "sample," or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the terms "biomarker" or "marker" refer to a measurable indicator of some biological state or condition. In particular, a biomarker may be a protein or peptide, e.g. a surface protein, that can be specifically stained and which is indicative of a biological feature of the cell, e.g. the cell type or the physiological state of the cell. An immune cell marker is a biomarker that is selectively indicative of a feature that relates to an immune response of a mammal. A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

As used herein, the term "field of view (FOV)" refers to an image portion that has a predetermined size and/or shape. In some embodiments, the FOV is a region in a digital image that is used for further manual or automated inspection and analysis. The FOV may be selected automatically or manually by analyzing some features of the digital image, e.g. by evaluating intensity values of the pixels of the digital image. PCT/EP2015/062015, describes methods for generating a particular FOV, such as based on some predetermined criteria or characteristics that are in an image (e.g. for a biological sample stained with more than two stains, identifying an area of the image that comprises just two stains).

As used herein, the term "image data" encompasses raw image data acquired from the biological tissue sample, such as by means of an optical sensor or sensor array, or pre-processed image data. In particular, the image data may comprise a pixel matrix.

As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, the term "mask" refers to a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

As used herein, the terms "multi-channel image" or "multiplex image" encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

Overview

The present disclosure relates to automated systems and methods for training a multilayer neural network to jointly and simultaneously classify cells and regions within a sample image. The present disclosure also relates to automated systems and methods for using a trained multilayer neural network to classify cells within an unlabeled image.

At least some embodiments of the present disclosure relate to computer systems and methods for analyzing digital images captured from biological samples, including tissue samples, stained with one or more primary stains (e.g. hematoxylin and eosin (H&E)) and one or more detection probes (e.g. probes containing a specific binding entity which facilitates the labeling of targets within the sample). While examples herein may refer to specific tissues and/or the application of specific stains or detection probes for the detection of certain markers (and hence diseases), the skilled artisan will appreciate that different tissues and different stains/detection probes may be applied to detect different markers and different diseases.

Figure 1:
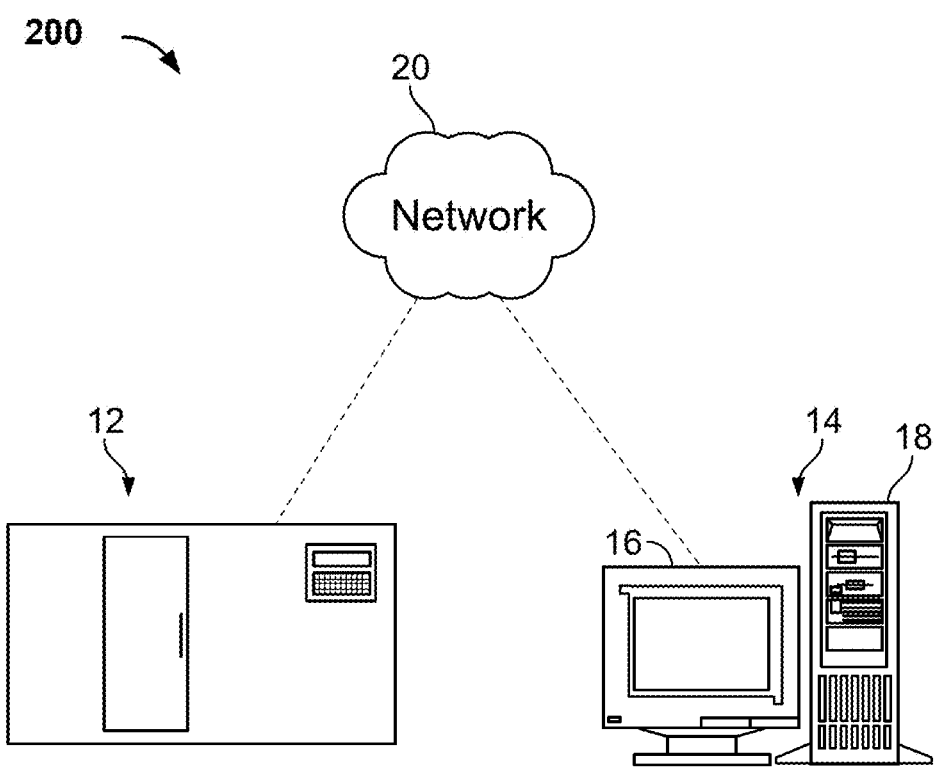
FIG. 1 illustrates a representative digital pathology system including an image acquisition device and a computer system.
Figure 2:
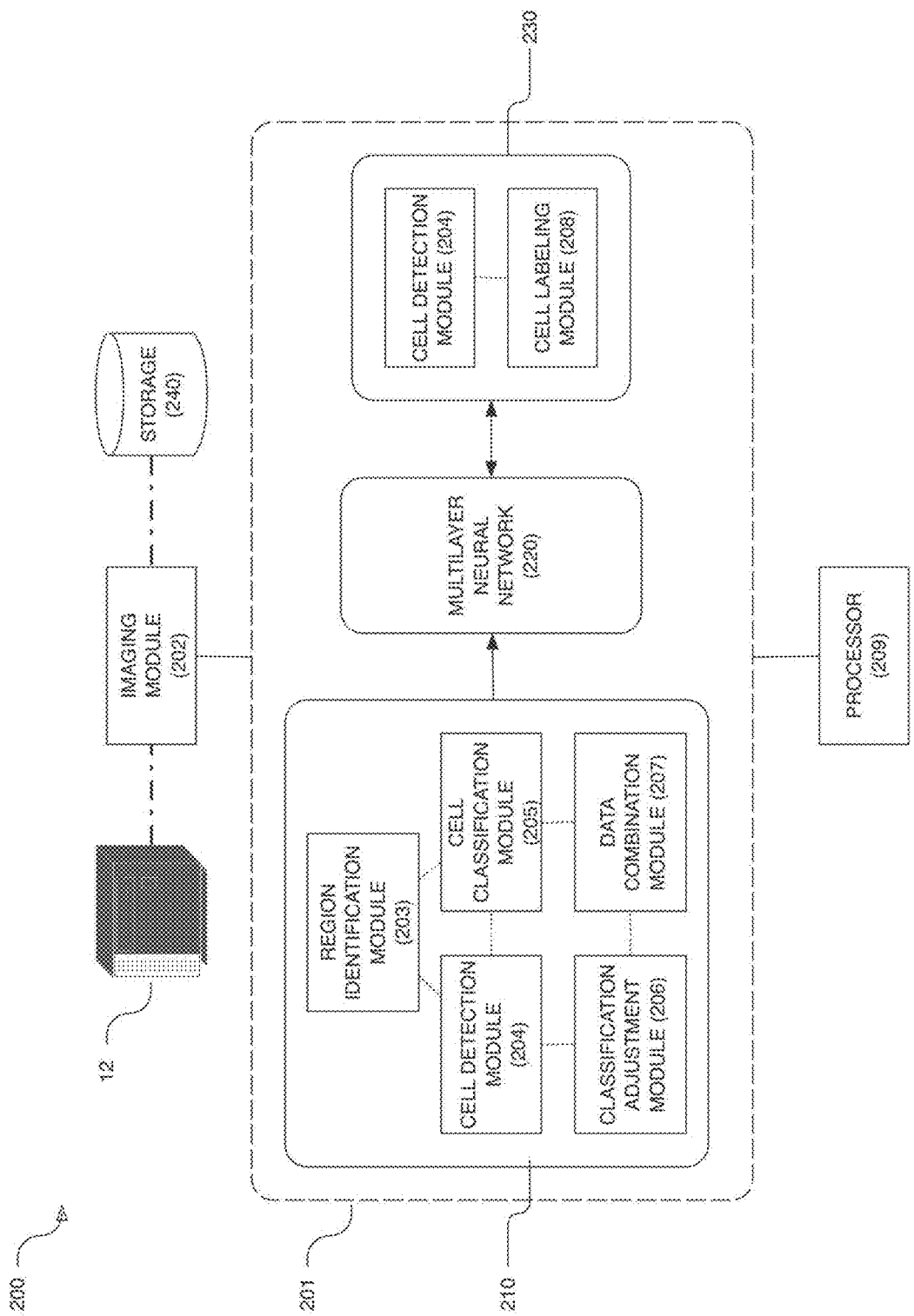
FIG. 2 sets forth various modules that can be utilized in a digital pathology system or within a digital pathology workflow.

A digital pathology system 200 for imaging and analyzing specimens is illustrated in FIGS. 1 and 2. The digital pathology system 200 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory 201, a computer storage medium (240), a computer program or set of instructions (e.g. where the program is stored within the memory or storage medium), one or more processors (209) (including a programmed processor), and any other hardware, software, or firmware modules or combinations thereof (such as described further herein). For example, the computing system 14 illustrated in FIG. 1 may comprise a computer with a display device 16 and an enclosure 18. The computer system can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as a VENTANA iScan HT scanner by VENTANA MEDICAL SYSTEMS, Inc. (Tucson, Ariz.) or other suitable imaging equipment. Additional imaging devices and systems are described further herein. The skilled artisan will appreciate that the digital color image acquired by the imaging apparatus 12 is conventionally composed of elementary color pixels. Each colored pixel can be coded over three digital components, each comprising the same number of bits, each component corresponding to a primary color, generally red, green or blue, also denoted by the term "RGB" components.

FIG. 2 provides an overview of the various modules utilized within the presently disclosed digital pathology system. In some embodiments, the digital pathology system employs a computer device or computer-implemented method having one or more processors 209 and at least one memory 201, the at least one memory 201 storing non-transitory computer-readable instructions for execution by the one or more processors to cause the one or more processors to execute instructions (or stored data) in a multilayer neural network 220 and in at least one of a ground truth training module 210 or a testing module 230.

In some embodiments, the ground truth training module 210 is adapted to receive one or more sample images from an imaging module 202, the imaging module communicatively coupled to an imaging apparatus 12 or a storage module 240. After receiving the image data, the ground truth training module 210 may execute one or more modules (or sub-modules), namely modules 203 through 207 such that ground truth data may be generated and supplied to the multilayer neural network 220 for training. In some embodiments, the ground truth training module 210 may first execute a region identification module 203 to such that regions or tissue regions within a sample image may be classified. In some embodiments, the region identification module 203 receives input from a pathologist or other trained medical professional, the information being received including image annotations. Subsequently, the ground truth training module 210 may execute a cell detection module 204 to identify cells within the sample image and, following cell detection, classify those cells using a cell classification module 205. A classification adjustment module 206 may be run such that the cell classification results from the cell classification module 205 may be adjusted, such as by using input from a pathologist or other training medical professional. Finally, the region classification data from the region identification module 203 and the cell classifications from the cell classification module 205 and/or the classification adjustment module may be combined using a data combination module to provide a single label for each pixel within the sample image. The pixel label data (i.e. the generated ground truth information) may then be supplied along with the sample image to the multilayer neural network 220 such that the multilayer neural network may be trained. In some embodiments, the ground truth training module 210 is semi-supervised. The some embodiments, the sample images received as input from the images module 202 are simplex images. In other embodiments, the sample images received as input from the imaging modules are multiplex images.

In some embodiments, the testing module 230 is configured to receive one or more unlabeled images from an imaging module 202. After receiving the unlabeled image data, the testing module 230 may execute or one or more modules (or sub-modules), namely modules 204 and 208. In some embodiments, the testing module is adapted to first execute instructions in a cell detection module 204 such that cells within the unlabeled image may be identified. Following cell identification, the unlabeled image is supplied to a trained multilayer neural network 220 such that all pixels within the unlabeled image may be assigned a predictive cell label. A cell labeling module 208 is then utilized by the testing module 230 to assign a label to each identified cell. In some embodiments, additional modules (not depicted) may be run by the testing module, e.g. a scoring module to provide an expression score based on the cell labels, an overlay generation module to provide identifying indicia as an overlay onto the unlabeled image.

The skilled artisan will also appreciate that additional modules may be incorporated into the workflow, and for use with either the ground truth training module 210 or the testing module 230. As will be described in more detail herein, in some embodiments, an image processing or pre-processing module may be run to apply certain filters to the acquired images or to identify certain histological and/or morphological structures or features within the tissue samples. Likewise, a region of interest selection module may be utilized to select a particular portion of a sample image or test for analysis. In addition, an unmixing module may be run to unmixing multiplex images prior to further processing.

Image Acquisition Module

In some embodiments, and as an initial step, and with reference to FIG. 2, the digital pathology system 200 runs an image acquisition module 202 to capture images (e.g. using an imaging apparatus 12) or image data of a biological sample having one or more stains (i.e. the images may be simplex images or multiplex images). In some embodiments, the images received or acquired are RGB images or multispectral images. In some embodiments, the images captured are stored in memory 201 (or within a storage module 240). It is from the acquired images that ground truth data may be derived for training the neural network, i.e. sample images or sample image data may be acquired or retrieved for generating ground truth data (steps 300 through 302). Likewise, unlabeled images or unlabeled image data may be acquired or retrieved and the cells within the unlabeled images or unlabeled image data may be classified using a trained multilayer neural network (steps 303 through 305). Any of the sample images or the unlabeled images be of a whole slide image or any portion thereof (e.g. a predetermined field-of-view).

In some embodiments, in place of the captured raw images, any set of optional pre-processed images from the captured raw images can be used, either as an independent input images or in combination with the captured raw images. Accordingly, similar pre-processing step can be used when applying the trained network to an unlabeled image, as described herein.

The images or image data (used interchangeably herein) may be acquired using the imaging apparatus 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles, or a line scanner capable of scanning the image in a line-by-line manner, such as the VENTANA DP 200 scanner. Alternatively, the images may be images that have been previously acquired (e.g. scanned) and stored in a memory 201 (or, for that matter, retrieved from a server via network 20).

In some embodiments, the system receives at least one image as input for deriving ground truth data. In general, the images received as input each comprise signals corresponding to a stain (including chromogens, fluorophores, quantum dots, etc.). In some embodiments, the at least one image has been stained with at least one primary stain (hematoxylin or eosin). In other embodiments, the at least one image has been stained in at least one of an IHC assay or ISH assay for the identification of a specific biomarker (referred to herein as a "biomarker" image). In some embodiments, multiple simplex images are as input, and those images may be derived from serial tissue sections, i.e. serial sections derived from the same xenograft tissue block. In some embodiments, the input images may be multiplex images, i.e. stained for multiple, different markers in a multiplex assay according to methods known to those of ordinary skill in the art.

A typical biological sample is processed in a staining/assay platform that applies a stain to the sample. In some embodiments, specimen processing apparatus is an automated apparatus, such as the BENCHMARK XT instrument, the SYMPHONY instrument, the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685. Alternatively, specimens can be manually processed.

Examples of commercially available H&E stainers include the VENTANA SYMPHONY (individual slide stainer) and VENTANA HE 600 (individual slide stainer) series H&E stainers from Roche; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH. Other commercial products on the market suitable for use as the staining/assay platform, one example being the Discovery™ product of Ventana Medical Systems, Inc. (Tucson, Ariz.).

The camera platform may also include a bright field microscope, one example being the VENTANA iScan HT product of Ventana Medical Systems, Inc., or any microscope having one or more objective lenses and a digital imager, as well as a set of spectral filters. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

As the skilled artisan will appreciate, a biological sample may be stained for different types of nuclei and/or cell membrane biomarkers. Methods for staining tissue structures and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)".

By way of one non-limiting example, and in the context of detecting breast cancer, in some embodiments the tissue sample is stained in an IHC assay for the presence of one or biomarkers including an estrogen receptor marker, a progesterone receptor marker, a Ki-67 marker, or a HER2 marker. As such, in some embodiments, the biomarker image used as an input is an IHC image which comprises signals (the signals corresponding to stains which may be, for example, chromogenic or fluorescent) corresponding to a presence of at least one of an estrogen receptor (ER) marker, a progesterone receptor (PR) marker, a Ki-67 marker, or a HER2 marker. In some embodiments, the sample can be analyzed to detect or measure the presence of ER, HER2, Ki-67 and PR proteins in the sample, for example a qualitative or quantitative measurement. By way of another non-limiting example, and in the context of detecting non-small cell lung cancer, in some embodiments the tissue sample is stained in an IHC assay for the presence of one or biomarkers including a PD-L1 biomarker. As such, in some embodiments, the biomarker image used as an input is an IHC image which comprises signals corresponding to a presence of a PD-L1 marker, CD3 marker and CD8 marker.

Whether the images acquired will be used as sample images for ground truthing or unlabeled images for classification, the images may contain information that needs to be masked. In some embodiments, the input images are optionally masked with a tissue masking module as described herein. In some embodiments, the input images are masked such that only tissue regions are present in the images. In some embodiments, a tissue region mask is generated to mask non-tissue regions from tissue regions. In some embodiments, a tissue region mask may be created by identifying the tissue regions and automatically or semi-automatically (i.e., with minimal user input) excluding the background regions (e.g. regions of a whole slide image corresponding to glass with no sample, such as where there exists only white light from the imaging source). The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2). Additional information and examples pertaining to the generation of tissue region masks is disclosed in PCT/EP/2015/062015, entitled "An Image Processing Method and System for Analyzing a Multi-Channel Image Obtained from a Biological Tissue Sample Being Stained by Multiple Stains,".

Training a Multilayer Neural Network

Figure 3A:
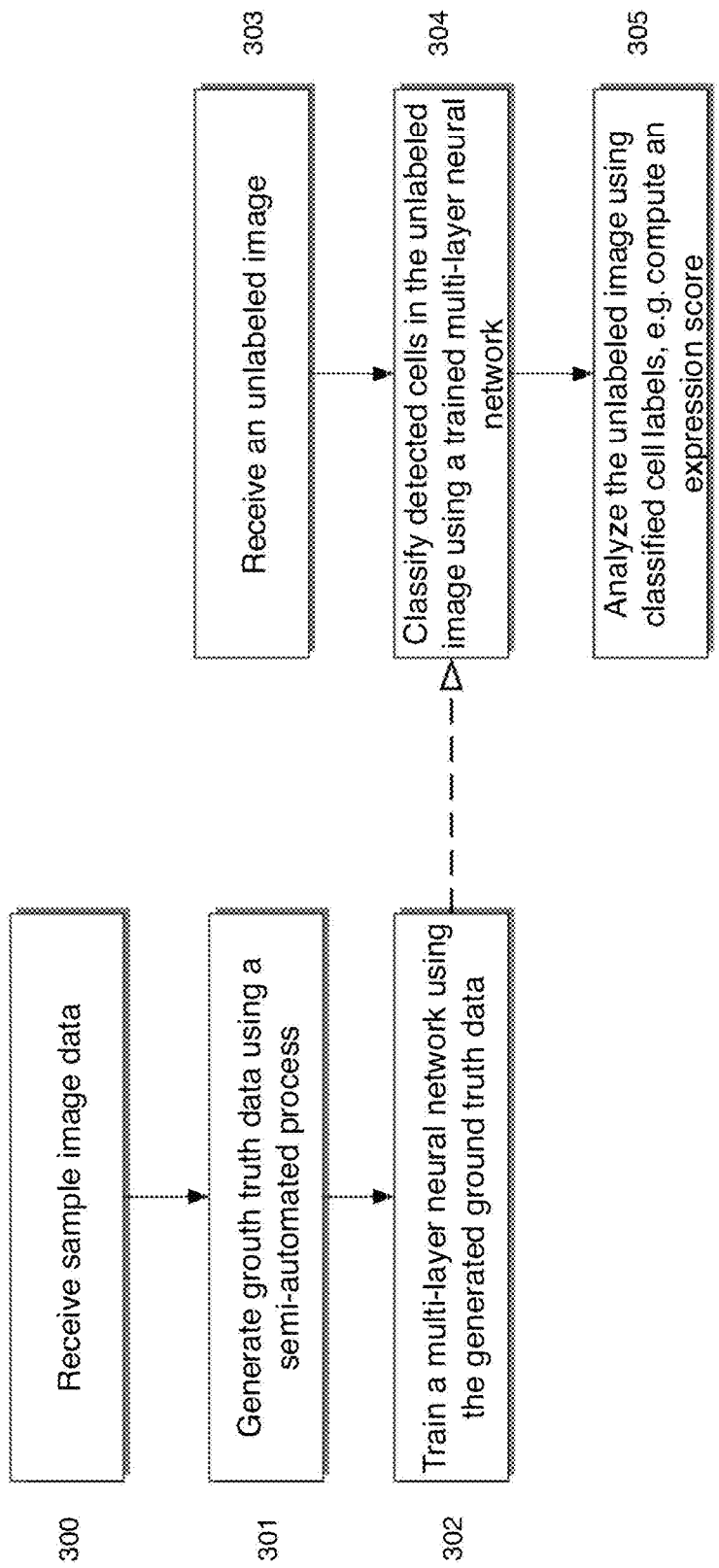
FIG. 3A illustrates the training of a multilayer neutral network and using the trained multilayer neural network in providing a classification result.

Referring to FIG. 3A, the training of a multilayer neural network comprises the steps of (i) receiving sample image data (step 300) (e.g. using an image acquisition module 202); (ii) generating ground truth data from the sample image data (step 301) (e.g. using a ground truth training module 210; and (iii) training the multilayer neural network (220) using the sample image data and the generated ground truth data (step 302).

Given a sample image, different tissue types and/or cell types may be identified in the sample image. For example, a sample image may be segmented into different types of regions, including tumor regions, lymphocyte-rich regions, stromal regions, and necrotic regions. Additionally, cells within the sample image may be detected and classified as being tumor, lymphocytes, stromal cells, etc. In view of this, the generation of ground truth data (step 301) comprises several steps, as outlined in FIG. 3B, including (a) identifying tissue regions in the sample image data (step 311); (b) detecting and classifying cells in the sample image data (step 312); (c) adjusting or correcting the cell classification using input received from a medical professional (step 313) (e.g. a pathologist or other medical expert trained to identify and classify different cell types in a biological sample); and (d) combining the tissue region identifications and corrected/adjusted cell classifications at a pixel level such that each pixel comprises a single label (e.g. a vector) (steps 314 and 315). Following generation of the ground truth data (steps 311 through 315), the ground truth data is fed to a multilayer neural network (220) such that the neutral network may be trained (step 316). Given the input of a pathologist or medical expert, the generation of the ground truth data is semi-supervised. Each of these steps will be described in further detail herein.

Region Identification

Ground truth data is then generated for various regions within the sample image, such as by using a region identification module 203. For example, ground truth data pertaining to the various tissue regions, e.g. normal tissue, tumor tissue, necrotic tissue, lymphatic lymphocyte-rich regions, stromal tissue, etc., may be generated from an H&E sample image. Of course, the skilled artisan will appreciate that the regions identified may be peri-tumor regions, immune margin regions, angioinvasion, neural invasion, comedo-like regions, plasmacyte or neutrophil-rich regions, activated stroma, hemorrhage, normal acini or ducts, etc., and the types of regions identified depends on the type of biological sample. In some embodiments, the identified portions are may be representative of over-expressive tumorous regions of a specific biomarker, e.g. a specific IHC marker.

In some embodiments, the various tissue regions within a sample image may be identified manually by a pathologist or medical professional. For example, a pathologist reviewing a biological sample may denote different regions or tissue regions by annotating the sample image. Assuming that the tissue region ground truth data is generated manually, it can be said that the generation of ground truth data (step 301) is semi-automated.

In some embodiments, image annotations may be drawn using an annotation tool provided in a viewer application (e.g. VIRTUOSO/VERSO™ or like software) and the annotations may be drawn at any magnification or resolution. In some embodiments, the pathologist manually annotates the border of a specific region (e.g. tumor), which is visually identifiable through distinct color, texture, histological structures, and cellular spatial arrangement. In some embodiments, the annotation boundaries are converted to solid (e.g. closed) polygons, each corresponding to an individual structure (e.g. an individual tumor nest).

Alternatively, or in addition, image analysis operations may be used to automatically detect tumor regions or other regions using automated image-analysis operations such as segmenting, thresholding, edge detection, etc., and FOVs automatically generated based on the detected regions. In some embodiments, image segmentation and tissue type identification is performed according to the methods described in PCT/EP2015/051302, filed Jan. 23, 2015 and entitled "Adaptive Classification for Whole Slide Tissue Segmentation" (published as WO2015/113895). In general, WO2015/113895 describes segmenting tumor regions from other regions in an image via operations related to classification of the regions that include identifying grid points in the tissue image, classifying the grid points as one of a plurality of tissue types, and generating classified grid points based on a database of known characteristics of tissue types, assigning the classified grid points at least one of a high confidence score and a low confidence score, modifying a database of known characteristics of tissue types based on the grid points that were assigned a high confidence score, and generating a modified database, and reclassifying the grid points that were assigned a low confidence score based on the modified database, to segment the tissue (e.g., identify tissue regions in an image).

Figures 4A, 4B, 4C:
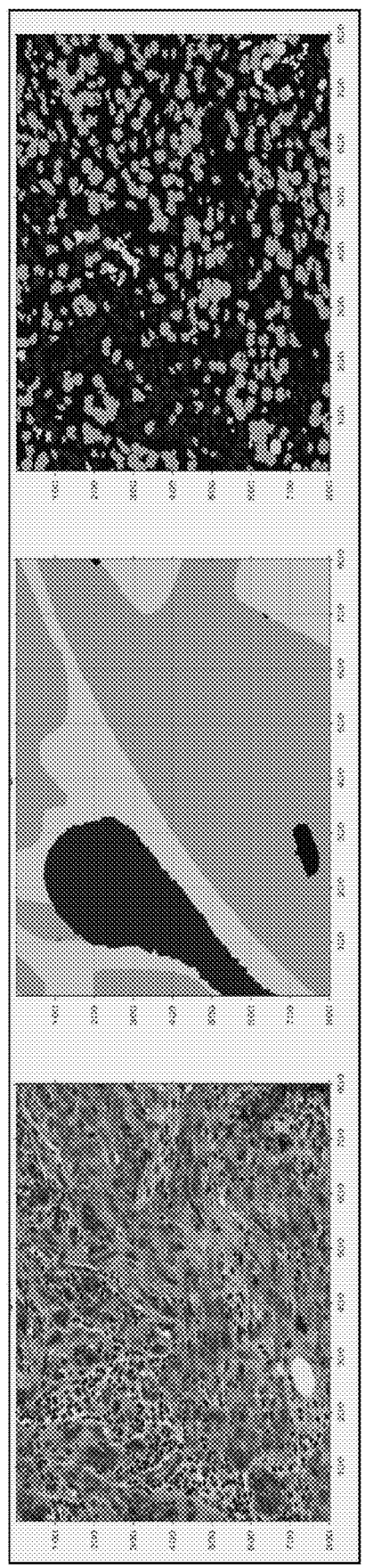
FIG. 4A illustrates a sample image.
FIG. 4B illustrates a tissue region overlay.
FIG. 4C illustrates a cell classification overlay, where tumor is depicted as cyan, stroma is depicted as yellow, lymphocytes are depicted as red, and artifacts/excluded regions are depicted as dark blue. For each pixel in the image, both a region and cell label is assigned.

Regardless of whether the tissue regions are identified via a manual process or via an automated process, a tissue region mask of a particular tissue region may be generated such as illustrated in FIG. 4B and FIG. 5B. Methods of generating tissue region masks are described in United States Patent Application Publication No. 2017/0154420.

Cell Detection and Classification

Following image acquisition and/or unmixing, input images or unmixed image channel images are provided to a cell detection module 204 to detect cells and subsequently to a cell classification module 205 to classify cells and/or nuclei (step 300). The procedures and algorithms described herein may be adapted to identify and classify various types of cells or cell nuclei based on features within the input images, including identifying and classifying tumor cells, non-tumor cells, stroma cells, and lymphocytes. The skilled artisan will appreciate that the cell types identified may be dependent on the sample image type and staining, e.g. in the context of immune cells, it could be that different types of immune cells including CD3 and CD8 are detected and classified. Likewise, the cell classifications may be marker positive tumor cells or marker negative tumor cells. By way of another example, in an IHC image stained with immune markers, such as CD3 or CD8 lymphocytes, the cells with membrane marker staining (DAB) are positive and lymphocytes, which are counterstained, are marker negative. The skilled artisan will appreciate that different tissues are comprised of different cell types, e.g. papillae in papillary thyroid cancer, glands in adenocarcinomas, and multinucleated giant cells in metaplastic carcinoma.

The skilled artisan will appreciate that the nucleus, cytoplasm and membrane of a cell have different characteristics and that differently stained tissue samples may reveal different biological features. Indeed, the skilled artisan will appreciate that certain cell surface receptors can have staining patterns localized to the membrane, or localized to the cytoplasm. Thus, a "membrane" staining pattern is analytically distinct from a "cytoplasmic" staining pattern. Likewise, a "cytoplasmic" staining pattern and a "nuclear" staining pattern are analytically distinct. Each of these distinct staining patterns may be used as features for identifying cells and/or nuclei. For example, stromal cells may be strongly stained by FAP, whereas tumor epithelial cells may be strongly stained by EpCAM, while cytokeratins may be stained by panCK. Thus, by utilizing different stains different cell types may be differentiated and distinguished during image analysis to provide a classification solution.

Methods of identifying, classifying, and/or scoring nuclei, cell membranes, and cell cytoplasm in images of biological samples having one or more stains are described in U.S. Pat. No. 7,760,927 ("the '927 Patent"). For example, U.S. Pat. No. 7,760,927 describes an automated method for simultaneously identifying a plurality of pixels in an input image of a biological tissue stained with a biomarker, including considering a first color plane of a plurality of pixels in a foreground of the input image for simultaneous identification of cell cytoplasm and cell membrane pixels, wherein the input image has been processed to remove background portions of the input image and to remove counterstained components of the input image; determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level.

In some embodiments, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial symmetry-based method, such as on the Hematoxylin image channel or a biomarker image channel after unmixing (see Parvin, Bahram, et al. "Iterative voting for inference of structural saliency and characterization of subcellular events." Image Processing, IEEE Transactions on 16.3 (2007): 615-623).

More specifically, in some embodiments the images received as input are processed such as to detect nucleus centers (seeds) and/or to segment the nuclei. For example, instructions may be provided to detect nucleus centers based on radial-symmetry voting using the techniques of Parvin (noted above). In some embodiments, nuclei are detected using radial symmetry to detect centers of nuclei and then the nuclei are classified based on the intensity of stains around the cell centers. In some embodiments, a radial symmetry based nuclei detection operation is used as described in commonly-assigned and co-pending patent application WO/2014/140085A1. For example, an image magnitude may be computed within an image and one or more votes at each pixel are accumulated by adding the summation of the magnitude within a selected region. Mean shift clustering may be used to find the local centers in the region, with the local centers representing actual nuclear locations. Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range [n/4, n/8]). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246.

Nuclei may be identified using other techniques known to those of ordinary skill in the art. For example, an image magnitude may be computed from a particular image channel of one of the H&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent, and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521. In some embodiments, once the seeds are detected, a locally adaptive thresholding method may be used, and blobs around the detected centers are created. In some embodiments, other methods may also be incorporated, such as marker based watershed algorithms can also be used to identify the nuclei blobs around the detected nuclei centers. These and other methods are described in co-pending application PCT/EP2016/051906, published as WO2016/120442.

Following detection of the nuclei, features (or metrics) are derived from within the input image. The derivation of metrics from nuclear features are well known in the art and any nuclear features known may be used in the context of the present disclosure. Non-limiting examples of metrics that may be computed include:

(A) Metrics Derived from Morphology Features

A "morphology feature" as used herein is, for example, a feature being indicative of the shape or dimensions of a nucleus. Without wishing to be bound by any particular theory, it is believed that morphological features provide some vital information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc. At the cellular level, such features are used to classify a nucleus as belonging to a healthy or diseased cell. At the tissue level, the statistics of these features over the tissue are exploited in the classification of a tissue as diseased or not.

(B) Metrics Derived from Appearance Features

An "appearance feature" as used herein is, for example, a feature having been computed for a particular nucleus by comparing pixel intensity values of pixels contained in or surrounding a nuclear blob or seed used for identifying the nucleus, whereby the compared pixel intensities are derived from different image channels (e.g. a background channel, a channel for the staining of a biomarker, etc.). In some embodiments, the metrics derived from appearance features are computed from percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Computing appearance feature metrics may be advantageous since the derived metrics may describe the properties of the nuclear regions as well as describe the membrane region around the nuclei.

(C) Metrics Derived from Background Features

A "background feature" is, for example, a feature being indicative of the appearance and/or stain presence in cytoplasm and cell membrane features of the cell comprising the nucleus for which the background feature was extracted from the image. A background feature and a corresponding metrics can be computed for a nucleus and a corresponding cell depicted in a digital image e.g. by identifying a nuclear blob or seed representing the nucleus; analyzing a pixel area (e.g. a ribbon of 20 pixels—about 9 microns—thickness around the nuclear blob boundary) directly adjacent to the identified set of cells are computed in, therefore capturing appearance and stain presence in cytoplasm and membrane of the cell with this nucleus together with areas directly adjacent to the cell. These metrics are similar to the nuclear appearance features, but are computed in a ribbon of about 20 pixels (about 9 microns) thickness around each nucleus boundary, therefore capturing the appearance and stain presence in the cytoplasm and membrane of the cell having the identified nucleus together with areas directly adjacent to the cell. Without wishing to be bound by any particular theory, the ribbon size is selected because it is believed that it captures a sufficient amount of background tissue area around the nuclei that can be used to provide useful information for nuclei discrimination. These features are similar to those disclosed by "J. Kong, et al., "A comprehensive framework for classification of nuclei in digital microscopy imaging: An application to diffuse gliomas," in ISBI, 2011, pp. 2128-2131". It is believed that these features may be used to determine whether the surrounding tissue is stroma or epithelium (such as in H&E stained tissue samples). Without wishing to be bound by any particular theory, it is believed that these background features also capture membrane staining patterns, which are useful when the tissue samples are stained with appropriate membrane staining agents.

(D) Metrics Derived from Color.

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(E) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells.

(F) Metris Derived from Texture Features

Examples of texture features and methods of their derivation are described in PCT Publication Nos. WO/2016/075095 and WO/2016/075096.

(G) Metrics Derived from Spatial Features

In some embodiments, spatial features include a local density of cells; average distance between two adjacent detected cells; and/or distance from a cell to a segmented region.

(H) Metrics Derived from Nuclear Features

The skilled artisan will also appreciate that metrics may also be derived from nuclear features. The computation of such nuclear features is described by Xing et al. "Robust Nucleus/Cell Detection and Segmentation in Digital Pathology and Microscopy Images: A Comprehensive Review," IEEE Rev Biomed Eng 9, 234-263, January 2016.

Of course, other features, as known to those of ordinary skill in the art, may be considered and used as the basis for computation of features.

By way of another example, cells may be classified as lymphocytes, such as described in PCT Publication No. WO/2016/075096. In particular, PCT Publication No. WO/2016/075096 describes a computer-implemented method of classifying cells within an image of a tissue sample stained in an IHC assay for the presence of a PD-L1 biomarker comprising computing nuclear feature metrics from features of nuclei within the image of the tissue sample; computing contextual information metrics based on nuclei of interest with the image of the tissue sample; and classifying the cells within the image of the tissue sample using a combination of the nuclear feature metrics and contextual information metrics (as input of the classifier), wherein the cells are classified as at least one of positive immune cells, positive tumor cells, negative immune cells, and negative tumor cells, or other cells. In some embodiments, the method further comprises the step of creating a foreground segmentation mask to identify individual nuclei within the cells. The publication further describes that, in the context of PD-L1-stained tissue, regions with lymphocytes that do not express the PD-L1 biomarker ("negative lymphocytes") are characterized by small blue blobs; regions with lymphocytes that do express the PD-L1 biomarker ("positive lymphocytes") are characterized by small blue blobs and brown blobs; tumor regions with cells predominantly expressing the PD-L1 biomarker ("positive tumor cells") are characterized by large blue blobs and brown rings; and tumor regions where cells do not express the PD-L1 biomarker ("negative tumor cells") are characterized by large blue blobs only.

In some embodiments, the image analysis module 207 is run more than once. For example, the image analysis module 207 is run a first time to extract features and classify cells and/or nuclei in a first image; and then run a second time to extract features and classify cells and/or nucleic in a series of addition images, where the additional images may be other simplex images or unmixed image channel images, or any combination thereof.

After features are derived, the feature may be used alone or in conjunction with training data (e.g. during training, example cells are presented together with a ground truth identification provided by an expert observer according to procedures known to those of ordinary skill in the art) to classify nuclei or cells. In some embodiments, the system can include a classifier that was trained based at least in part on a set of training or reference slides for each biomarker. The skilled artisan will appreciate that different sets of slides can be used to train a classifier for each biomarker. Accordingly, for a single biomarker, a single classifier is obtained after training. The skilled artisan will also appreciate that since there is variability between the image data obtained from different biomarkers, a different classifier can be trained for each different biomarker so as to ensure better performance on unseen test data, where the biomarker type of the test data will be known. The trained classifier can be selected based at least in part on how best to handle training data variability, for example, in tissue type, staining protocol, and other features of interest, for slide interpretation.

In some embodiments, the classification module is a Support Vector Machine ("SVM"). In general, a SVM is a classification technique, which is based on statistical learning theory where a nonlinear input data set is converted into a high dimensional linear feature space via kernels for the non-linear case. Without wishing to be bound by any particular theory, it is believed that support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data are classified on the basis of where they fall with respect to the hyperplane. The kernel function K defines the method in which data are projected into the high-dimensional space.

In other embodiments, classification is performed using an AdaBoost algorithm. The AdaBoost is an adaptive algorithm which combines a number of weak classifiers to generate a strong classifier. Image pixels identified by a pathologist during the training stage (e.g. those having a particular stain or belonging to a particular tissue type) are used to generate probability density functions for each of the individual texture features $\Phi j$, for $j \in \{1, \ldots, K\}$ which are considered as weak classifiers. Bayes Theorem is then used to generate likelihood scenes $Lj=(Cj, Ij \in \{1, \ldots, K\}$ for each $\Phi j$ which constitute the weak learners. These are combined by the AdaBoost algorithm into a strong classifier $\pi j = \Sigma Ti = 1 ajilji$ where for every pixel $cj \in Dj, \pi j$ (cj) is the combined likelihood that pixel cj belongs to class $\omega T$, where aji is the weight determined during training for feature $\Phi i$, and T is the number of iterations.

In some embodiments, a classifier is used to distinguish between tumor nuclei from other candidate nuclei which also may be further classified (for example, by identifying lymphocyte nuclei and stroma nuclei). In some embodiments, a learnt supervised classifier is applied to identify tumor nuclei, as described further herein. For example, the learnt supervised classifier is trained on nuclei features to identify tumor nuclei and then applied to classify the nucleus candidate in the unlabeled image as either a tumor nucleus or a non-tumor nucleus. Optionally, the learnt supervised classifier may be further trained to distinguish between different classes of non-tumor nuclei, such as lymphocyte nuclei and stromal nuclei. In some embodiments, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in an unlabeled image into tumor nuclei and non-tumor nuclei. Optionally, the random forest classifier may be further trained to distinguish between different classes of non-tumor nuclei, such as lymphocyte nuclei and stromal nuclei.

Correction of Automated Cell Classification

Following cell detection and classification using automated image analysis as described above, the automated classifications may be adjusted or otherwise corrected by a pathologist or other medical professional (step 314). In this way, the cell classification is semi-automated or semi-supervised. For example, cell classifications provided by the automated image analysis algorithms may be displayed as an overlay over the sample image in a viewer, and the medical professional may then review suspect cell classifications to confirm that the cell was correctly classified. If, on the other hand, the cell was incorrectly classified, the medical professional may have the opportunity to adjust the cell classification, i.e. manually override the automated cell classification. For example, the medical professional may manually select misclassified cells and relabel them with a correct classification. It will be appreciated by the skilled artisan that by reviewing the automated classification results, better ground truth training data may be supplied to the multilayer neural network. The output of step 314 is a combination of the correctly identified classifications from the automated image analysis and the set of adjusted cell classifications, providing "final" cell classifications.

Combining of Region Level and Cell Level Classification Data

After the cell classification results have been reviewed by a medical professional, the tissue region identifications and cell classifications are combined at the pixel level (step 314).

This step of the process takes into consideration a priori knowledge of biological systems. The skilled artisan will appreciate that certain types of cells may not be found in certain types of tissue. For example, it is infeasible that stromal cells will be found in lymphocyte-rich regions. By discarding those biologically infeasible combinations, the ground truth data becomes enriched with background knowledge facilitating improved training of the multilayer neural network.

For example, FIG. 6 illustrates different regions and different cells which may be classified. While 20 different combinations are possible, only a smaller subset of combinations are biologically feasible. In this example, biologically feasible combinations of cell types in tissue regions include (i) tumor cells in tumor regions; (ii) stromal cells in tumor regions; (iii) lymphocytes in tumor regions; (iv) tumor cells in stromal regions; (v) stromal cells in stromal regions; (vi) lymphocytes in stromal regions; (vii) tumor cells in lymphocyte-rich regions; and (viii) lymphocytes in lymphocyte-rich regions. Of course, the extent of the biologically feasible combinations may differ based on the sample type or sample source, and the skilled artisan will be able to provide instructions to discard certain combinations.

In some embodiments, the system may identify a region, but no cell type may be associated with a pixel within that identified region. In this situation, the pixel may be labeled with a region label and a label "background cell" (e.g. tumor region, background cell), where the label "background cell" serves as a "placeholder" denoting that the region does not contain any relevant type of cell. As such, a label of "background cell" is indicative of no cell type. In some embodiments, a detected cell may also be considered a "background cell" if the detection is not a cell of interest or an artifact that can be ignored.

Each pixel within the sample image is then assigned a label (step 315) comprising the cell type and region type to which the pixel belongs. For example, a pixel label may be (tumor cell, stromal region). In this way, each pixel is labeled with biologically feasible labels.

Multilayer Neural Network

Figure 3B:
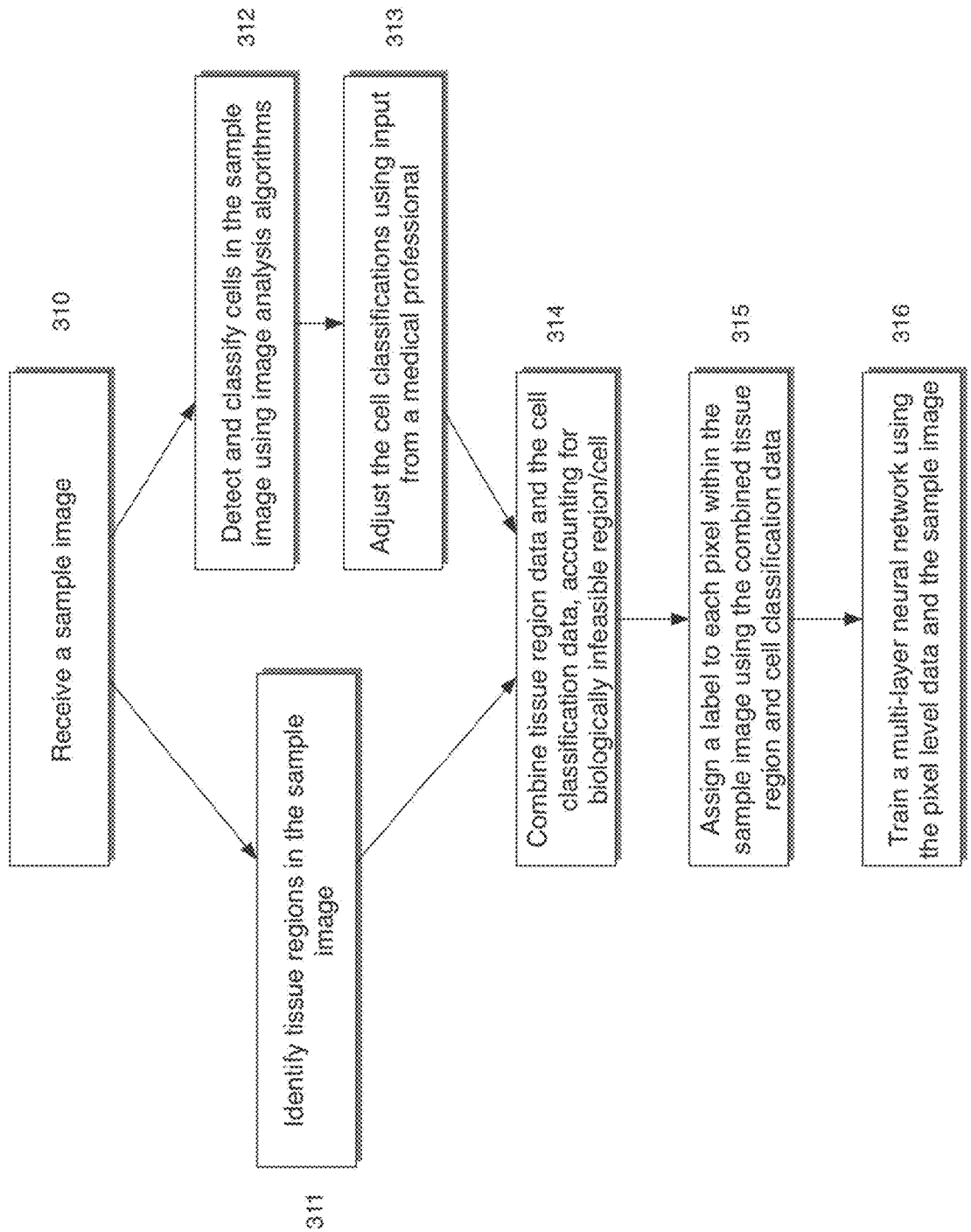
FIG. 3B outlines the steps of training a multilayer neutral network using a sample image.

A multilayer neural network is then trained using the sample image and the labels assigned to each pixel within the sample image (step 302 of FIG. 3A; step 316 of FIG. 3B). Any multilayer neural network may be implemented for this purpose. Suitable multilayer neural networks include the LeNet proposed by Yann LeCun; the AlexNet proposed by Alex Krizhevsky et al.; the ZF Net proposed by Matthew Zeiler et al.; the GoogLeNet proposed by Szegedy et al.; the VGGNet proposed by Karen Simonyan et al.; and the ResNet proposed by Kaiming He et al. In some embodiments, the multilayer neural network is VGG16 (Simonyan, 2014). In other embodiments, the multilayer neural network is DenseNet (see Huang et al., "Densely Connected Convolutional Networks," arXiv:1608.06993). In some embodiments, a fully convolutional neural network is utilized, such as described by Long et al., "Fully Convolutional Networks for Semantic Segmentation," Computer Vision and Pattern Recognition (CVPR), 2015 IEEE Conference, June 2015 (INSPEC Accession Number: 15524435).

The neural networks are typically trained on a large and publicly available image data archives (such as ImageNet, Russakovsky et al, 2015, ImageNet Large Scale Visual Recognition Challenge. IJCV, 2015) of natural images. Given that typically the training images for biological specimens such as tumor samples are fewer, transfer learning methods are adopted. In some embodiments, "transfer learning" methods may be used, where pre-trained networks, such as those mentioned above, along with their learnt weights are used to initialize the training process on the new set of training images, and trained to adapt the weights to the specific application at hand (see, Pan, S. J., & Yang, Q. (2010). A Survey on Transfer Learning. IEEE Transactions on Knowledge and Data Engineering, 22(10), 1345-1359. doi:10.1109/tkde.2009.191). In some embodiments, the pre-trained networks are trained on existing public or private datasets that may or may not be directly related to the application of interest, and may or may not be biological in nature. In some embodiments, the final layers' weights are initialized at random to avoid falling into suboptimal local minima, while in other embodiments, the final layers' weights are imported unchanged.

Following training of the multilayer neural network (step 302), one or more unlabeled images of biological samples for which ground truth is not available may be provided to the trained classifier, as noted herein, to classify regions and cells within the unlabeled image (steps 303 and 304).

Classifying Regions and Cells Using a Trained Multilayer Neural Network

The present disclosure also provides systems and methods of classifying regions and cells using a trained multilayer network (see FIG. 3A). In some embodiments, unlabeled image data is provided to a trained multilayer neural network (step 303), where the trained multilayer neural network classifies detected cells in the unlabeled image (step 304). Once the cells are classified within the unlabeled image, the classification results may be used for further analysis (e.g. creating overlay masks, scoring, etc.). Each of these steps will be described in further detail herein.

Figure 3C:
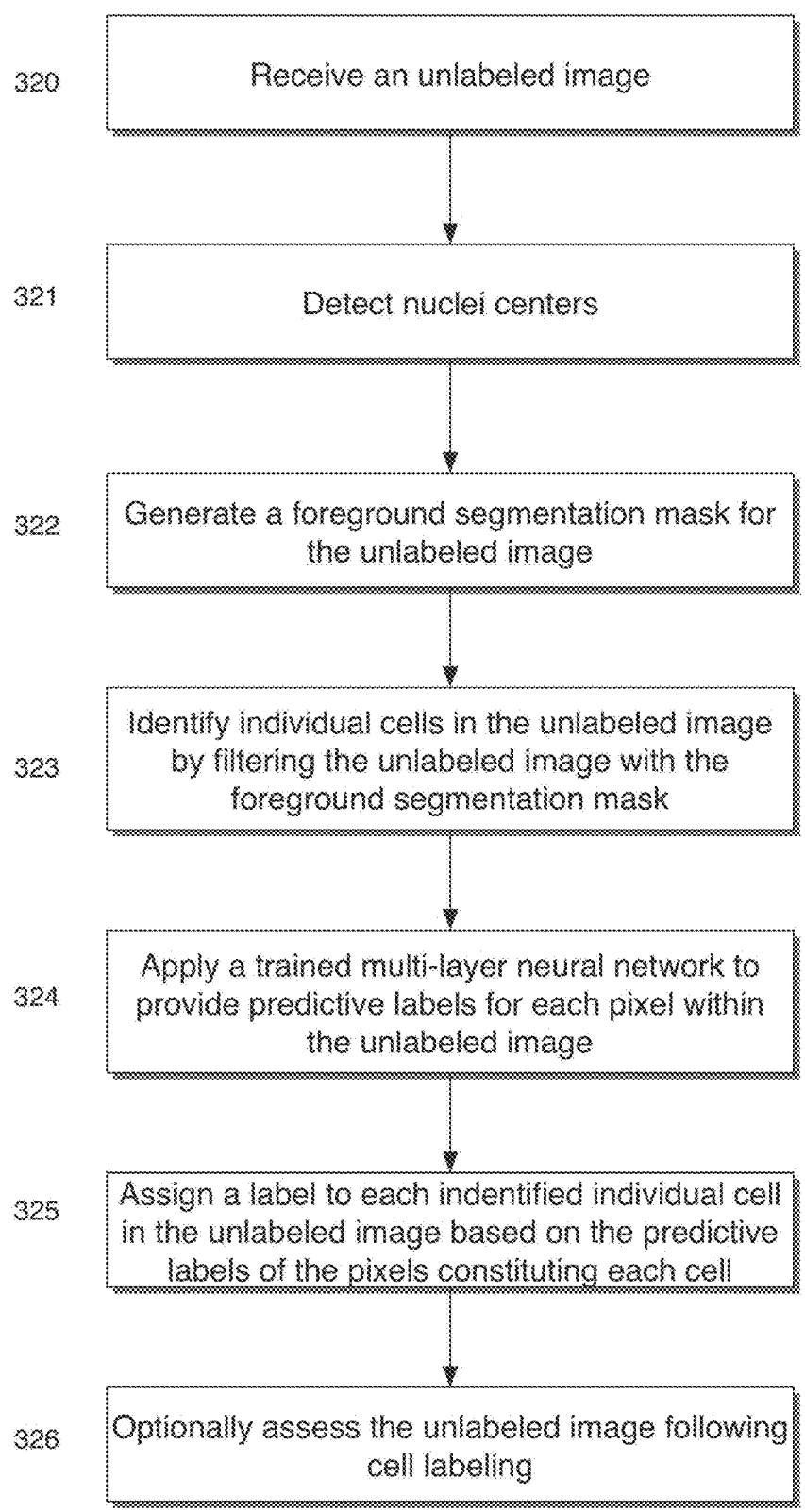
FIG. 3C illustrates the steps of using a trained multilayer neural network to classify cells in an unlabeled image.

With reference to FIG. 3C, in some embodiments the system first receives an unlabeled image to be classified (step 320). The unlabeled image to be classified may be acquired using the image acquisition module 202 described herein or may be retrieved from memory 201 (or from a storage module 240). The unlabeled image may be pre-processed using any of the modules identified herein, e.g. a tissue region masking module or a field-of-view determination module.

Next, cell nuclei are detected (step 321) within the unlabeled image using a cell detection module 204. Cell nuclei may be detected according to any of the methods described herein that were used to detect cells for ground truth data generation (e.g. using a radial symmetry-based cell detection method). In other embodiments, cell nuclei may be determined using the methods described in United States Patent Application Publication No. 2017/0098310. In particular, US Publication No. 2017/0098310 describes a method for automatically discerning a cell nucleus boundary in a digital image of a biological tissue sample comprising identifying, by a processor, one or more initial edges in the digital image and using the pixels within the identified initial edges as initial voting pixels; using, by the processor, a tensor voting field for performing tensor voting operations on pixels in a neighborhood of each of the initial voting pixels; accumulating, by the processor, a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixel lies; and decomposing, by the processor, each of the determined tensor values for determining eigenvalues and eigenvectors of the decomposed tensor value; evaluating, by the processor, the determined eigenvalues and eigenvectors for identifying refined edge pixels, the refined edge pixels representing the cell nucleus boundary; and generating, by the processor, a saliency edge strength image which selectively comprises the identified refined edge pixels representing the cell nucleus boundary.

In other embodiments, image segmentation is performed according to the methods described by Veta et al. "Automatic Nuclei Segmentation in H&E Stained Breast Cancer Histopathology Images," PLoS One. 2013; 8(7): e70221. According to this method, image segmentation can be divided into four main steps: 1) pre-processing, 2) marker-controlled watershed segmentation, 3) post-processing, and 4) merging of the results from multiple scales. The aim of the pre-processing is to remove irrelevant content while preserving the boundaries of the nuclei. The pre-processing starts with color unmixing for separation of the hematoxylin stain from the RGB image. The grayscale version of the hematoxylin image is then processed with a series of morphological operations in order to remove irrelevant structures. The core part of the procedure is the marker-controlled watershed segmentation. Two types of nuclear markers are used: markers extracted using an image transform that highlights structures of high radial symmetry regional minima of the pre-processed image. In the post-processing step, regions unlikely to represent nuclei are removed and the contours of the remaining regions are parameterized as ellipses. By varying the size of the structuring element in the pre-processing step, the segmentation procedure can be tuned to look for nuclei at different scales, allowing multi-scale analysis. The segmentation results from the multiple scales and two marker types are then merged by resolving concurrent regions to give the final segmentation.

In other embodiments, a foreground segmentation mask is computed (step 322) and the generated foreground segmentation mask is used to filter the unlabeled image to identify individual cells (step 323). In some embodiments, the foreground segmentation mask is generated using the methods described in United States Patent Application Publication No. 2017/0337596. In particular, US 2017/0337596 describes computing a foreground segmentation by (1) applying filters to enhance the image such that (a) image regions unlikely to have nuclei are discarded, and (b) nuclei within a local region are identified; and (2) further applying optional filters to selectively remove artifacts, remove small blobs, remove discontinuities, fill holes, and split up bigger blobs. In some embodiments, the filters applied are selected from the group consisting of a global thresholding filter, a locally adaptive thresholding filter, morphological operation filters, and watershed transformation filters. In some embodiments, the global thresholding filter is applied first, followed by application of the locally adaptive thresholding filter. In some embodiments, the optional filters to selectively remove artifacts, remove small blobs, remove discontinuities, fill holes, and split up bigger blobs are applied after application of the locally adaptive thresholding filter. In some embodiments, the identification of the individual nuclei further comprises performing a connected-components labeling process on the filtered input image.

Next, unlabeled image is supplied to a trained multilayer neural network 220 (step 324). The skilled artisan will appreciate that the multilayer neural network 220 must have been trained to classify the types of cells present (or suspected to be present) in the unlabeled image. For example, if the network was trained to recognize and classify lymphocytes and tumor cells in a breast cancer sample, then the unlabeled image must also be of a breast cancer sample. In some embodiments, the multilayer neural network may be trained with sample images (simplex or multiplex) derived from multiple types of cancers, and classify the sample images from that specific type of cancer. After the unlabeled image is supplied to the trained multilayer neural network, the network provides a predictive classification at the pixel level, i.e. each pixel within the unlabeled image is assigned a specific predictable cell type label, e.g. tumor cell, stromal cell, etc.

Using the pixel level predictive classifications, a label is then assigned to each identified cell (step 325). In some embodiments, the assignment of a cell label to each identified individual cell comprises (i) quantifying a number of pixels bearing each predictive classification label within the identified individual cell; and (ii) assigning as the cell label the predictive label having the greatest quantity. In some embodiments, a generated foreground mask may be overlaid on top of an unlabeled image, and each of the different predictive pixel labels within any region (i.e. identified cell) may be quantified and then the predictive label having the greatest quantity will be selected as the cell label. For example, if a particular identified cell comprises 100 total pixels, and 55 of those total pixels are predicted to be tumor cell pixels, 40 of those total pixels are predicted to be stromal cells, and 5 of those total pixels are predicted to be lymphocytes, then the cell would be assigned the label of a tumor cell since the majority of the pixels were predicted to be tumor cell pixels. Alternatively, if there is no foreground segmentation, established nuclei centers may be utilized during label assignment (i.e. a small radial circle around the centers, for example a grouping of pixels with a circle having a radius of about 5 pixels). In that case, the majority pixel label is used as the label of the cell.

Following assignment of cell labels, the image may be further assessed (step 326). For example, in some embodiments, a scoring module may be employed to generate one or more expression scores. Methods for scoring are described in further detail in commonly-assigned and co-pending applications WO/2014/102130A1 "Image analysis for breast cancer prognosis" filed Dec. 19, 2013, and WO/2014/140085A1 "Tissue object-based machine learning system for automated scoring of digital whole slides", filed Mar. 12, 2104. For example, based on the detected positive and negative tumor cells/nuclei, various slide level scores such as marker percent positivity may be computed using one or more methods.

In some embodiments, scoring may be determined for a particular region of interest or field-of-view. The region of interest or FOV may be manually selected by a pathologist or medical profession or may be automatically selected based on morphology within the unlabeled image (see, for example, United States Patent Application Publication No. 2017/0154420).

In other embodiments, the classification results may be overlaid on the unlabeled image. For example, each cell within the unlabeled image may be labeled with a color or other indicia (see FIG. 4C and FIG. 5C). FIGS. 4A-C and 5A-C illustrate examples of ground truth images, where the regions were manually annotated. Likewise, the nuclei centers were detected using a traditional method (e.g. radial symmetry, as described herein) and foreground segmentation was conducted around each detected center as the associated cell mask. A traditional classifier (described herein) was used to assign a label to the cells. These assigned labels were then manually corrected (where there were false classifications) by a pathologist using an image annotation platform.

EXAMPLE

A non-limiting example is provided to illustrated the various steps outlined herein.

Background

Biomarkers that predict response to HER2-targeted therapy and anthracycline-based chemotherapy are needed for personalized patient care. Histology-based assessment of tumor infiltrating lymphocytes (TILs) appear to be prognostic and potentially therapy-predictive in breast cancers. However, the inter-play of TILs, tumor cells, other microenvironment mediators, their spatial relationships, quantity, and other image-based features have yet to be determined exhaustively and systemically in the context of these medical needs. To quantify and explore these aspects in patient cohorts, we developed a deep learning based image analysis algorithm for both region-level and cell-level segmentation and classification of breast cancer H&E tissue whole slide images.

Methodology: Overview

Deep learning (DL) is a machine learning approach where multi-layered (deep) convolutional neural networks are trained to automatically discover salient features to discriminate between different structures of interest. For automated interpretation of H&E images, we set out to identify tumor, stromal and lymphocytic cells and the tumor and stromal regions, and reject other regions (e.g. necrosis, artifacts). A single deep network was trained for the combined region and cell classification at pixel level. The region level ground truth is manually annotated. However, it is tedious to manually annotate each cell and is also error-prone. To mitigate this problem, a semi-automated method is used where a pathologist manually corrects the false classifications output by an image analysis algorithm. Methodology: Deep Learning Training and Validation To train the network, 20 whole slide images @ 20× magnification were used for region and cell annotations (~20,000 regions, 500,000 cells, 2×108 pixels@ 0.5 μm).

To validate, four sub regions of ~1 mm×1 mm (~10,000 regions, 200,000 cells, 108 pixels) per whole slide in eight whole slides were used—see FIGS. 4 and 5 (color coding for cells: tumor (green), stroma (yellow), lymphocytes (red); color coding for regions: tumor (cyan), stroma (yellow), lymph (red), artifacts (dark blue)).

Results

The developed algorithm was compared with pathologists ground truth in two experiments.

In the first experiment, six H&E breast cancer cases with 14 annotated smaller regions @20×. Two pathologists manually annotated—9000 cells as ground truth. For algorithm comparison, only those ground truth annotations from both pathologists that were in agreement were retained and ignored otherwise.

| GT | Tumor #(%) | Stroma #(%) | Lymphocyte #(%) |
|---|---|---|---|
| Tumor | 1115 (92.9) | 54 (4.5) | 31 (2.6) |
| Stroma | 1 (2.0) | 66 (94.3) | 3 (3.7) |
| Lymphocyte | 15 (2.4) | 46 (7.2) | 579 (90.4) |

In a second experiment, a semi-automated approach (present disclosure) was used to ground truth 10,000 regions and 200,000 cells. A single pathologist visually reviewed and corrected cell labels output by a feature-based method and without discarding any ambiguous cell labels.

| GT | Tumor #(%) | Stroma #(%) | Lymphocyte #(%) |
|---|---|---|---|
| Tumor | 102720 (85.6) | 960 (8.0) | 7680 (6.4) |
| Stroma | 7350 (10.5) | 46060 (65.0) | 16590 (23.7) |
| Lymphocyte | 650 (6.5) | 980 (9.8) | 8370 (83.7) |

For region-level ground truth validation, overlapping heterogeneous regions, such as stromal and lymphocytic areas, are challenging for pathologists to delineate regionally; hence, we assessed computational accuracy combining these regions.

| | Tumor Region#(%) | Stromal + Lymphocytic Region #(%) |
|---|---|---|
| Tumor Region | 8910 (89.1) | 1090 (10.9) |
| Stromal + Lymphocytic Region | 720 (7.2) | 9280 (92.8) |

In view of the above results, Applicants have demonstrated that a novel and robust method involving a deep convolutional neural network is feasible for combined classification of regions and cells in H&E breast cancer images.

Results are depicted in FIGS. 7 and 8A-D. With reference to FIG. 7, the cells are detected, segmented and cell classification labels are generated using the semi-automated approach, described herein, in the regions manually annotated by a pathologist. The shown cell label is at cell-level, i.e. for all the pixels corresponding to a single connected blob reflecting single outline, the common cell label assigned is shown. The region level label is at pixel level, i.e., all the pixels belonging to one region category as shown in one particular color. The labels are color coded. The tumor cells, lymphocytes and stromal cells are shown in green, red and yellow respectively. The lower images are the results of classifying the sample image using the trained multilayer neural network. The region label image is shown in the bottom right and the cell level label image in the bottom left. The region label image is shown at pixel level and the cell label image shown the cell classification label at the cell level. As described herein, the multilayer neural network outputs a classified image, assigning a combined (region, cell) label for each and every pixel. In a follow up step, the combined label is separated into two different labels—a cell label and a region label—for each pixel. In the next step, taking as additional inputs the nucleus/cell center locations along with the associated foreground blob segmentation mask for each cell, a classification label is derived for each cell (at cell level) aggregated from the cell labels at the pixel level.

Other Components for Practicing Embodiments of the Present Disclosure

Other components (e.g. systems or modules) are described below which may be used in conjugation with the systems and methods of the present disclosure.

Unmixing Module

In some embodiments, the images received as input may be multiplex images, i.e. the image received is of a biological sample stained with more than one stain. In these embodiments, and prior to further processing, the multiple image is first unmixed into its constituent channels, where each unmixed channel corresponds to a particular stain or signal. In some embodiments, the unmixed images (often referred to as "channel images" or "image channel images") and may be used as the input for each module described herein. For example, inter-marker heterogeneity may be determined with a first H&E image, a second multiplex image stained for a plurality of cluster of differentiation markers (CD3, CD8, etc.), and a plurality of simplex images each stained for a particular biomarker (e.g. ER, PR, Ki67, etc.). In this example, the multiplex image is first unmixed into its constituent channel images, and those channel images may be used along with the H&E image and the plurality of simplex images to determined inter-marker heterogeneity.

In some embodiments, in a sample comprising one or more stains and hematoxylin, individual images may be produced for each channel of the one or more stains and hematoxylin. Without wishing to be bound by any particular theory, it is believed that these channels highlight different tissue structures in the tissue image, thus, they may be referred to as structural image channels. In some embodiments, unmixing provides at least a hematoxylin image channel image. In some embodiments, an acquired image is unmixed into a separate channel representing the local amounts of hematoxylin and highlighting nuclei regions within the image. The skilled artisan will appreciate that features extracted from these channels are useful in describing the different biological structures present within any image of a tissue.

The multi-spectral image provided by the imaging module 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with an unmixing module using liner unmixing. Linear unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161. In linear stain unmixing, the measured spectrum ($S(\lambda)$) at any pixel is considered a linear mixture of stain spectral components and equals the sum of the proportions or weights (A) of each individual stain's color reference ($R(\lambda)$) that is being expressed at the pixel $$S(\lambda)=A_1*R_1(\lambda)+A_2*R_2(\lambda)+A_3*R_3(\lambda)$$

which can be more generally expressed as in matrix form as $$S(\lambda)=\Sigma A_1*R_1(\lambda) \text{ or } S+R*A$$

If there are M channels images acquired and N individual stains, the columns of the M×N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains (A,) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j\{S(\lambda_j)-\Sigma_i A_1*R_i(\lambda_j)\}2]/\partial A_i=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on Feb. 23, 2015. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

Other System Components

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

After the specimens are processed, a user can transport specimen-bearing slides to the imaging apparatus. In some embodiments, the imaging apparatus is a brightfield imager slide scanner. One brightfield imager is the iScan Coreo brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

According to embodiments disclosed herein, the multi-layer neural network is adapted from LeNet, AlexNet, ZF Net, DetectNet, GoogLeNet, VGGNet ResNet, VGG16, and DenseNet.

According to embodiments disclosed herein, the method further comprises generating an overlay comprising descriptive indicia for each labeled individual cell.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

What is claimed is:

1. A method for classifying cells, the method comprising:
receiving an image comprising a plurality of pixels depicting a plurality of cells and one or more tissue regions;

detecting a cell nucleus for each cell of the plurality of cells;

computing a foreground segmentation mask for the image based on the detected cell nuclei;

identifying each cell of the plurality of cells by filtering the image with the computed foreground segmentation mask;

generating a predictive label for each pixel of the plurality of pixels with a multilayer neural network trained with training images depicting cells and tissue regions, wherein the predictive label indicates a cell type of a plurality of cell types for the respective pixel; and assigning a cell label to each identified cell, the cell label corresponding to one cell type of the plurality of cell types, wherein the cell label is assigned based on the generated predicative labels for pixels corresponding to the respective identified cell indicating the one cell type.

2. The method of claim 1, further comprising quantifying differently labeled individual cells and computing an expression score.

3. The method of claim 1, further comprising quantifying a number of lymphocytes in a tumor region or a stromal region.

4. The method of claim 1, wherein the assigning of the cell label to each identified cell comprises (i) quantifying a number of pixels bearing each predictive label within the identified cell; and (ii) assigning as the cell label the predictive label having a greatest quantity.

5. A non-transitory computer-readable storage medium encoded with instructions executable by one or more processors of a computing system to cause the computing system to perform one or more operations comprising:

receiving an image comprising a plurality of pixels depicting a plurality of cells and one or more tissue regions;

detecting a cell nucleus for each cell of the plurality of cells;

computing a foreground segmentation mask for the image based on the detected cell nuclei;

identifying each cell of the plurality of cells by filtering the image with the computed foreground segmentation mask;

generating a predictive label for each pixel of the plurality of pixels with a multilayer neural network trained with training images depicting cells and tissue regions, wherein the predictive label indicates a cell type of a plurality of cell types for the respective pixel; and assigning a cell label to each identified cell, the cell label corresponding to one cell type of the plurality of cell types, wherein the cell label is assigned based on the generated predicative labels for pixels corresponding to the respective identified cell indicating the one cell type.

6. The non-transitory computer-readable storage medium of claim 5, wherein the one or more operations further comprise quantifying differently labeled individual cells and computing an expression score.

7. The non-transitory computer-readable storage medium of claim 5, wherein the one or more operations further comprise quantifying a number of lymphocytes in a tumor region or a stromal region.

8. The non-transitory computer-readable storage medium of claim 5, wherein the assigning of the cell label to each identified cell comprises (i) quantifying a number of pixels bearing each predictive label within the identified cell; and (ii) assigning as the cell label the predictive label having a greatest quantity.

9. A system comprising:

one or more processors; and a non-transitory computer-readable memory storing instructions which, when executed by the one or more processors, cause the one or more processors to perform one or more operations comprising:

receiving an image comprising a plurality of pixels depicting a plurality of cells and one or more tissue regions;

detecting a cell nucleus for each cell of the plurality of cells in the image;

computing a foreground segmentation mask for the image based on the detected cell nuclei;

identifying each cell of the plurality of cells by filtering the image with the computed foreground segmentation mask;

generating a predictive label for each pixel of the plurality of pixels with a multilayer neural network trained with training images depicting cells and tissue regions, wherein the predictive label indicates a cell type of a plurality of cell types for the respective pixel; and assigning a cell label to each identified cell, the cell label corresponding to one cell type of the plurality of cell types, wherein the cell label is assigned based on the generated predicative labels for pixels corresponding to the respective identified cell indicating the one cell type.

10. The system of claim 9, wherein the one or more operations further comprise quantifying differently labeled individual cells and computing an expression score.

11. The system of claim 9, wherein the one or more operations further comprise quantifying a number of lymphocytes in a tumor region or a stromal region.

12. The system of claim 9, wherein the assigning of the cell label to each identified cell comprises (i) quantifying a number of pixels bearing each predictive label within the identified cell; and (ii) assigning as the cell label the predictive label having a greatest quantity.

* * * * *